United States Patent
Cho et al.

(10) Patent No.: US 9,544,819 B2
(45) Date of Patent: *Jan. 10, 2017

(54) ELECTRONIC DEVICE AND METHOD FOR OPERATING AN ELECTRONIC DEVICE

(71) Applicant: LG ELECTRONICS INC., Seoul (KR)

(72) Inventors: Jihoon Cho, Seoul (KR); Juhyung Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

This patent is subject to a terminal disclaimer.

(21) Appl. No.: 14/567,852

(22) Filed: Dec. 11, 2014

(65) Prior Publication Data

US 2015/0092663 A1    Apr. 2, 2015

Related U.S. Application Data

(63) Continuation of application No. 13/576,362, filed as application No. PCT/KR2011/000270 on Jan. 14, 2011, now Pat. No. 8,942,626.

(60) Provisional application No. 61/308,309, filed on Feb. 26, 2010.

(51) Int. Cl.
| | | |
|---|---|---|
| *H04W 36/00* | (2009.01) | |
| *H04W 76/02* | (2009.01) | |
| *H04B 7/14* | (2006.01) | |
| *H04W 88/04* | (2009.01) | |
| *H04W 88/06* | (2009.01) | |

(52) U.S. Cl.
CPC ........... *H04W 36/0016* (2013.01); *H04B 7/14* (2013.01); *H04W 76/023* (2013.01); *H04W 88/04* (2013.01); *H04W 88/06* (2013.01)

(58) Field of Classification Search
CPC .... H04W 88/06; H04W 88/04; H04W 76/023; H04W 36/0016; H04B 7/14
See application file for complete search history.

(56) References Cited

U.S. PATENT DOCUMENTS

| | | | |
|---|---|---|---|
| 7,092,709 B1 | 8/2006 | Honkala et al. | |
| 7,751,819 B2 * | 7/2010 | Isobe | ...... H04L 47/14 370/331 |
| 7,948,925 B2 | 5/2011 | Miyabayashi et al. | |
| 8,233,841 B2 | 7/2012 | Griffin et al. | |
| 8,483,744 B2 | 7/2013 | Takada et al. | |

(Continued)

FOREIGN PATENT DOCUMENTS

| | | |
|---|---|---|
| EP | 1770900 | 4/2007 |
| EP | 1898592 | 3/2008 |

(Continued)

OTHER PUBLICATIONS

NFC Forum, "Connection Handover Technical Specification," XP055137374, Nov. 2008, 44 pages.

(Continued)

*Primary Examiner* — Ajay Cattungal
(74) *Attorney, Agent, or Firm* — Lee, Hong, Degerman, Kang & Waimey

(57) ABSTRACT

The present invention relates to an electronic device and a method of operating the same. The electronic device and the method of operating the electronic device may effectively form a connection between two or more electronic devices by allowing a relaying device to transfer connection information between the electronic devices to a counterpart.

14 Claims, 36 Drawing Sheets

(56) References Cited

U.S. PATENT DOCUMENTS

| | | | |
|---|---|---|---|
| 8,554,230 B2 | 10/2013 | Han | |
| 8,559,397 B2 | 10/2013 | Huang et al. | |
| 8,565,131 B2 | 10/2013 | Miyabayashi et al. | |
| 8,565,210 B2 | 10/2013 | Cho et al. | |
| 8,576,777 B2 | 11/2013 | Youn et al. | |
| 8,599,823 B2 | 12/2013 | Laroia et al. | |
| 8,630,604 B2 | 1/2014 | Kung et al. | |
| 8,649,315 B2 | 2/2014 | Kang et al. | |
| 8,649,354 B2 | 2/2014 | Kenington et al. | |
| 8,660,563 B2 | 2/2014 | Lee et al. | |
| 8,942,626 B2 * | 1/2015 | Cho | H04W 76/023 370/331 |
| 2005/0272428 A1 * | 12/2005 | Tanabe | H04L 47/14 455/439 |
| 2006/0052107 A1 * | 3/2006 | Isobe | H04L 47/14 455/436 |
| 2007/0001853 A1 | 1/2007 | Otranen | |
| 2009/0111378 A1 | 4/2009 | Sheynman et al. | |
| 2009/0177530 A1 | 7/2009 | King et al. | |
| 2009/0191811 A1 | 7/2009 | Griffin et al. | |
| 2009/0222659 A1 | 9/2009 | Miyabayashi et al. | |
| 2009/0323645 A1 | 12/2009 | Fukami et al. | |
| 2009/0325484 A1 | 12/2009 | Lele et al. | |
| 2012/0257549 A1 | 10/2012 | Chin et al. | |
| 2012/0263106 A1 | 10/2012 | Lee et al. | |
| 2012/0289154 A1 | 11/2012 | Son et al. | |
| 2014/0018082 A1 | 1/2014 | Cheng et al. | |

FOREIGN PATENT DOCUMENTS

| | | |
|---|---|---|
| JP | 0236642 | 2/1990 |
| JP | 2001285337 | 10/2001 |
| JP | 2004080400 | 3/2004 |
| JP | 2004200887 | 7/2004 |
| JP | 2005142907 | 6/2005 |
| JP | 2006121533 | 5/2006 |
| JP | 2007097022 | 4/2007 |
| JP | 2009-218845 | 9/2009 |
| JP | 2009239573 | 10/2009 |
| JP | 2010-021906 | 1/2010 |
| WO | 2010/002497 | 1/2010 |

OTHER PUBLICATIONS

European Patent Office Application Serial No. 11747585.5, Search Report dated Sep. 22, 2015, 10 pages.

Japan Patent Office Application Serial No. 2012-554892, Office Action dated Sep. 18, 2013, 2 pages.

NFC Forum, Connection Handover, Technical Specifcation, NFCForum-NCTS—Connection Handover_1.1, Nov. 2008, 44 pages.

Japan Patent Office Application Serial No. 2014-057103, Office Action dated Nov. 4, 2014, 5 pages.

Japan Patent Office Application No. 2015-090044, Notice of Allowance dated Jul. 1, 2012, 3 pages.

* cited by examiner

F I G. 1 7

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hr" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1 "active") |
| 12 | 0x01 | 1 | Carrier Data Reference Length (1 byte) |
| 13 | 0x30 | 1 | Carrier Data Reference |
| 14 | 0x00 | 1 | Auxiliary Data Reference Count (0) |
| 15 | 0x5A | 1 | NDEF record header (TNF=0x01, SR=1, MB=0, ME=1, IL=1) |
| 16 | 0x02 | 1 | Record type length (2 byte) |
| 17 | 0x19 | 1 | Payload length (25 byte) |
| 18 | 0x01 | 1 | Payload ID length (1 byte) |
| 19 | 0x48, 0x63 | 2 | Record type: "Hc" |
| 21 | 0x30 | 1 | Payload ID "0" |
| 22 | 0x02 | 1 | Carrier Type Format CTF=0x02 |
| 23 | 0x17 | 1 | Carrier Type Length (23 byte) |
| 24 | "application/vnd.wfa.wsc" | 23 | Carrier Type |

F I G. 1 9

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hs" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1), active |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5A | 1 | NDEF record header (TNF=0x02, SR=1, MB=0, ME=1, IL=1) |
| 16 | 0x17 | 1 | Record type length (23 byte) |
| 17 | 0x42 | 1 | Payload length (66 byte) |
| 18 | 0x01 | 1 | Payload ID length (1 byte) |
| 19 | "application/vnd.wfa.wsc" | 23 | Record type |
| 42 | 0x30 | 1 | Payload ID "0" |
| 43 | 0x104A | 2 | WPS Attribute Type: Version |
| 45 | 0x0001 | 2 | Version Length: 1 byte |
| 47 | 0x10 | 1 | Version=1.0 |
| 48 | 0x100E | 2 | WPS Attribute: Credential |
| 50 | 0x0039 | 2 | Credential Length: 57 byte |
| 52 | 0x1026 | 2 | WPS Attribute: Network Index |
| 54 | 0x0001 | 1 | Network Index Length: 1 byte |
| 56 | 0x10 | 2 | Network Index=1 |
| 57 | 0x1045 | 2 | WPS Attribute: SSID |
| 59 | 0x0008 | 8 | SSID Length: 8 byte |
| 61 | "Home WLAN" | 2 | SSID="HomeWLAN" |
| 69 | 0x1003 | 2 | WPS Attribute: Authentication Type |
| 71 | 0x0002 | 2 | Authentication Type Length: 2 byte |
| 73 | 0x0020 | 2 | Authentication Type: WPA2PSK |
| 75 | 0x100F | 2 | WPS Attribute: Encryption Type |
| 77 | 0x0002 | 2 | Encryption Type Length: 2 byte |
| 79 | 0x0008 | 2 | Encryption Type: AES |
| 81 | 0x1027 | 2 | WPS Attribute: Network Key |
| 83 | 0x000E | 2 | Network Key Length: 14 byte |
| 85 | "MyPreSharedKey" | 14 | Network Key="MyPreSharedKey" |
| 99 | 0x1020 | 2 | WPS Attribute: MAC Address |
| 101 | 0x0006 | 2 | MAC Address Length: 6 byte |
| 103 | 00:07:E9:4C:A8:1C | 6 | MAC Address |

FIG. 21

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hr" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1 "active") |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5C | 1 | NDEF record header (TNF=0x04, SR=1, MB=0, ME=1, IL=1) |
| 16 | 0x10 | 1 | Record type length (16 byte) |
| 17 | 0x31 | 1 | Payload length (49 byte) |
| 18 | 0x01 | 1 | Payload ID length (1 byte) |
| 19 | "bluetooth.org:sp" | 16 | Record type |
| 35 | 0x30 | 1 | Payload ID "0" |
| 36 | 0x0031 | 2 | Bluetooth OOB Data Length (49 byte) |
| 38 | 01:07:80:80:bf:A1 | 6 | Bluetooth Device Address |
| 44 | 0x04 | 1 | EIR Data Length (4 byte) |
| 45 | 0x0D | 1 | EIR Data Type: Class of Device |
| 46 | 08:06:20 | 3 | Camera Device |
| 49 | 0x11 | 1 | EIR Data Length (17 byte) |
| 50 | 0x0E | 1 | EIR Data Type |
| 51 | 01:02:03:04:05:06:07:08:09:10:11:12:13:14:15:16 | 16 | Simple Pairing Hash C |
| 67 | 0x11 | 1 | EIR Data Length (17 byte) |
| 68 | 0x0F | 1 | EIR Data Type |
| 69 | 01:02:03:04:05:06:07:08:09:10:11:12:13:14:15:16 | 16 | Simple Pairing Randomizer R |

FIG. 23

| Offset | Content | Length | Explanation |
|---|---|---|---|
| 0 | 0x91 | 1 | NDEF record header (TNF=0x01, SR=1, MB=1, ME=0, IL=0) |
| 1 | 0x02 | 1 | Record type length (2 byte) |
| 2 | 0x0A | 1 | Payload length (10 byte) |
| 3 | 0x48, 0x72 | 2 | Record type: "Hs" |
| 5 | 0x10 | 1 | Version number (major, minor) |
| 6 | 0xD1 | 1 | NDEF record header (TNF=0x01, SR=1, MB=1, ME=1, IL=0) |
| 7 | 0x02 | 1 | Record type length (2 byte) |
| 8 | 0x04 | 1 | Payload length (4 byte) |
| 9 | 0x61, 0x63 | 2 | Record type: "ac" |
| 11 | 0x01 | 1 | Carrier Flags (CPS=1), active |
| 12 | 0x01 | 1 | Carrier Data Reference Length (1 byte) |
| 13 | 0x30 | 1 | Carrier Data Reference "0" |
| 14 | 0x00 | 1 | Auxiliary Data Reference Count (0) |
| 15 | 0x5C | 1 | NDEF record header (TNF=0x04, SR=1, MB=0, ME=1, IL=1) |
| 16 | 0x10 | 1 | Record type length (16 byte) |
| 17 | 0x31 | 1 | Payload length (49 byte) |
| 18 | 0x01 | 1 | Payload ID length (1 byte) |
| 19 | "bluetooth.org:sp" | 16 | Record type |
| 35 | 0x30 | 1 | Payload ID "0" |
| 36 | 0x0031 | 2 | Bluetooth OOB Data Length (49 byte) |
| 38 | 01:07:80:80:bf:01 | 6 | Bluetooth Device Address |
| 44 | 0x04 | 1 | EIR Data Length (4 byte) |
| 45 | 0x0D | 1 | EIR Data Type: Class of Device |
| 46 | 04:06:08 | 3 | Printer Device |
| 49 | 0x11 | 1 | EIR Data Length (17 byte) |
| 50 | 0x0E | 1 | EIR Data Type |
| 51 | 01:02:03:04:05:06:07:08:09:10:11:12:13:14:15:16 | 16 | Simple Pairing Hash C |
| 67 | 0x11 | 1 | EIR Data Length (17 byte) |
| 68 | 0x0F | 1 | EIR Data Type |
| 69 | 01:02:03:04:05:06:07:08:09:10:11:12:13:14:15:16 | 16 | Simple Pairing Randomizer R |

F I G. 2 7

```
HTTP/1.1 200  OK
CACHE-CONTROL:max-age:1800
LOCATION:  http"//192.168.0.10:8080/description.xml
SERVER:  Linux/2.6.22.5 UPnP/1.0 PrinterScanner/1.2
USN:   uuid:622addb0-522f-11dc-8314-0800200c9a66::upnp:rootdevice
USN:   uuid:622addb0-522f-11dc-8314-0800200c9a66::\
urn:schemas-upnp-org:device:Basic:1.0
USN:   uuid:753e0be8-522f-11dc-8314-0800200c9a66::\
urn:schemas-upnp-org:device:Printer:1
USN:   uuid:18d098fa-5230-11dc-8314-0800200c9a66::\
urn:schemas-upnp-org:device:Scanner:1
USN:   uuid:753e0be8-522f-11dc-8314-0800200c9a66::\
urn:schemas-upnp-org:service:PrintEnhanced:1
USN:   uuid:18d098fa-5230-11dc-8314-0800200c9a66::\
urn:schemas-upnp-org:service:Scan:1
```

FIG. 31(a)

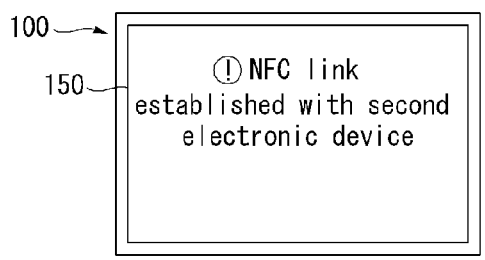

① NFC link established with second electronic device

FIG. 31(b)

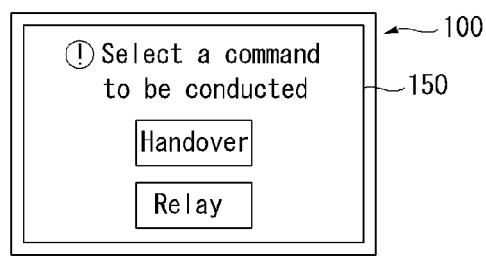

① Select a command to be conducted

Handover

Relay

FIG. 31(c)

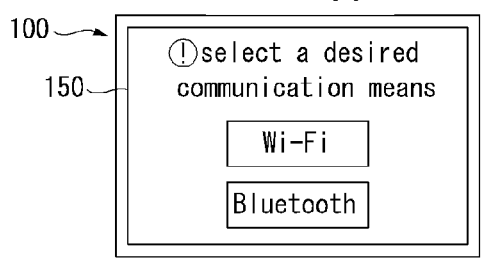

① select a desired communication means

Wi-Fi

Bluetooth

FIG. 31(d)

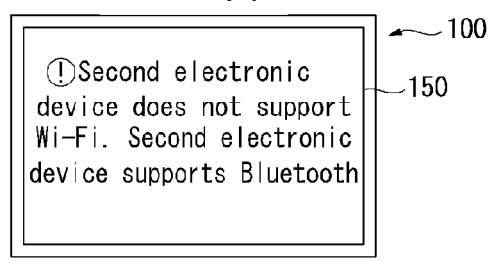

① Second electronic device does not support Wi-Fi. Second electronic device supports Bluetooth

FIG. 31(e)

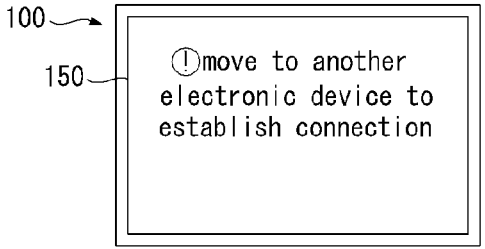

① move to another electronic device to establish connection

FIG. 31(f)

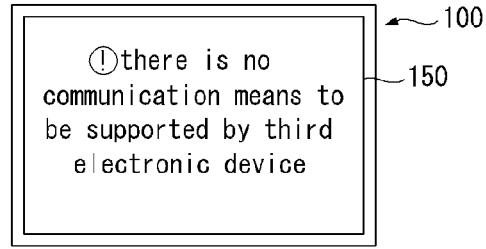

① there is no communication means to be supported by third electronic device

FIG. 31(g)

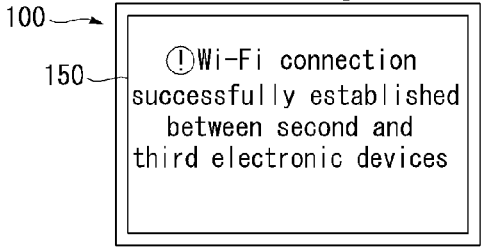

① Wi-Fi connection successfully established between second and third electronic devices

FIG. 31(h)

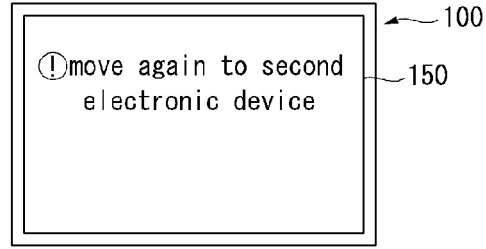

① move again to second electronic device

FIG. 33
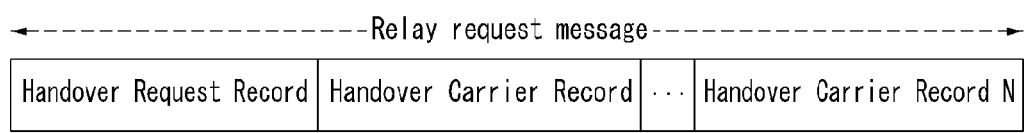
CASE 1
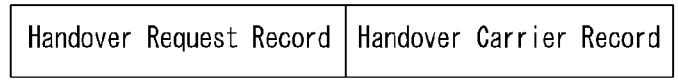
CASE 2(a)
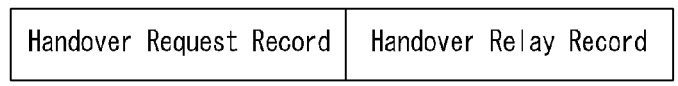
CASE 2(b)
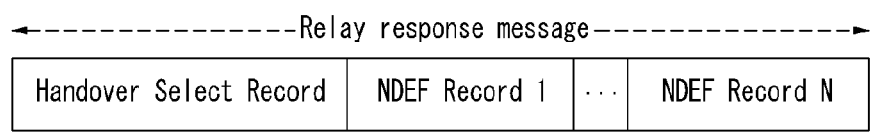
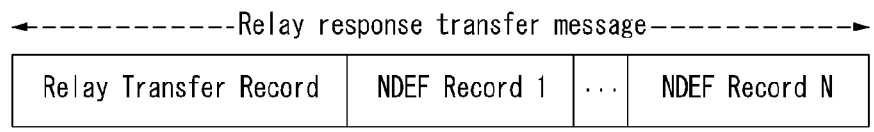

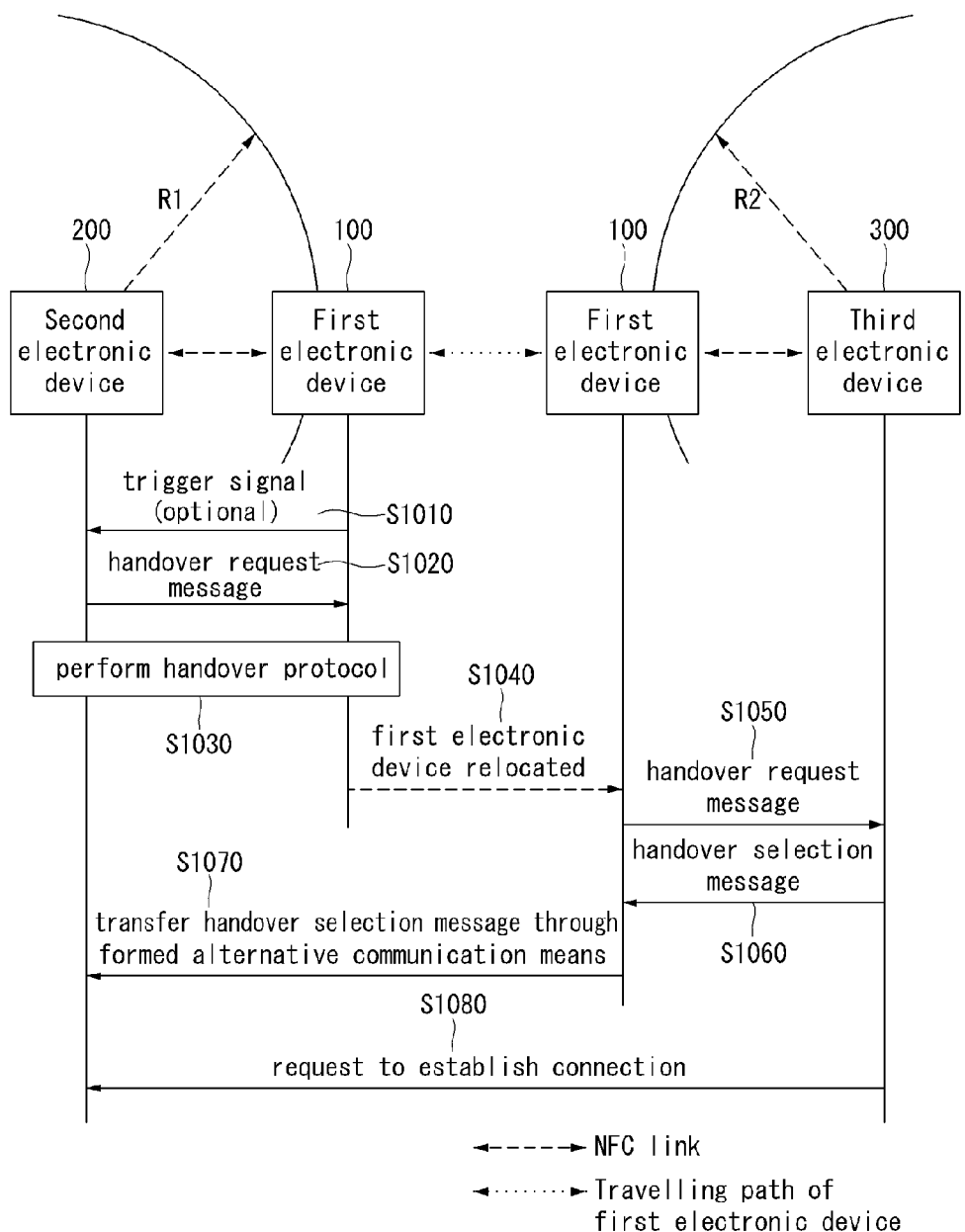

FIG. 36(a)          FIG. 36(b)
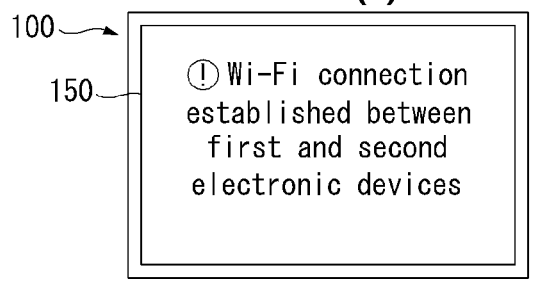
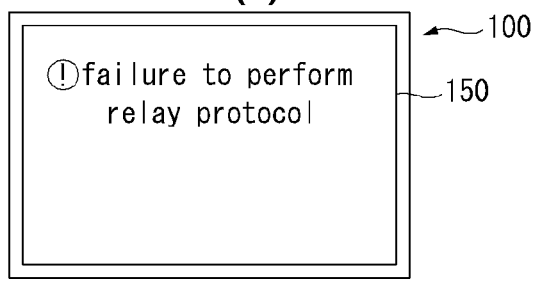

ELECTRONIC DEVICE AND METHOD FOR OPERATING AN ELECTRONIC DEVICE

CROSS-REFERENCE TO RELATED APPLICATIONS

This application is a continuation of U.S. patent application Ser. No. 13/576,362, filed on Jul. 31, 2012, now U.S. Pat. No. 8,942,626, which is the National Stage filing under 35 U.S.C. 371 of International Application No. PCT/KR2011/000270, filed on Jan. 14, 2011, which claims the benefit of U.S. Provisional Application No. 61/308,309, filed on Feb. 26, 2010, the contents of which are all hereby incorporated by reference herein in their entirety.

TECHNICAL FIELD

The present invention relates to a method of forming a connection between electronic devices. More specifically, the present invention relates to a method of using a near-field communication means to form a connection between electronic devices.

BACKGROUND ART

NFC (Near Field Communication, hereinafter "NFC") is a very short-range contactless data transfer technology associated with RFID (radio frequency identification) and may be used for communication with devices within a distance of 10 cm or less (preferably, 4 cm or less).

NFC employs a center frequency of 13.56 MHz and may provide a transmission rate of 106, 212, 424 kbps. NFC may be compatible with various contactless communication protocols, such as, for example, protocols defined in ISO 14443 type A, B, and F and ISO 18092.

NFC may have various applications, such as home networking, smart poster, or bus ticketing.

An NFC-supported electronic device may communicate with other NFC-supported electronic devices through at least one of, e.g., a reader mode, a card emulation mode, and a peer-to-peer mode.

DISCLOSURE

Technical Problem

A technical object is to provide a method for forming a connection between two or more electronic devices using a near-field communication link.

Objects of the present invention are not limited thereto, and other objects may be apparent to those skilled in the art from the description taken in conjunction with the accompanying drawings.

Technical Solution

According to an aspect of the present invention, there is provided a method of operating a third device to establish a new communication link between a first device and a second device, the method comprising the steps of obtaining first communication link information associated with a communication link other than a communication link established through tagging with the third device from the first device and transferring the first communication link information to the second device so that the new communication link is established between the first device and the second device.

According to another aspect of the present invention, there is provided third device of establishing a new communication link between a first device and a second device, wherein the third device comprises a communication unit that establishes a communication link through tagging and a controller that obtains first communication link information associated with a communication link other than a communication link established through tagging with the third device from the first device and transfers the first communication link information to the second device so that the new communication link is established between the first device and the second device.

Advantageous Effects

The present invention may form a connection between two or more electronic devices using a relay device.

DESCRIPTION OF DRAWINGS

FIG. 17 illustrates a binary content of the Wi-Fi handover request message according to an embodiment of the present invention.

FIG. 19 illustrates a binary content of a handover selection message according to an embodiment of the present invention.

FIG. 21 illustrates a binary content of a Bluetooth handover request message according to an embodiment of the present invention.

FIG. 23 illustrates a binary content of a Bluetooth handover request message according to an embodiment of the present invention.

FIG. 27 illustrates additional data of a handover selection message utilizing additional data according to a second embodiment of the present invention.

FIGS. 31(a), 31(b), 31(c), 31(d), 31(e), 31(f), 31(g), and 31(h) are views for describing a guide message used for a relay protocol according to the present invention.

FIG. 33 illustrates an example of a relay request message according to an embodiment of the present invention.

FIG. 35 is a view for describing a relay protocol according to a fourth embodiment of the present invention.

FIGS. 36(a) and 36(b) illustrate a guide message used for the relay protocol according to the present invention.

BEST MODE

Figure 1:
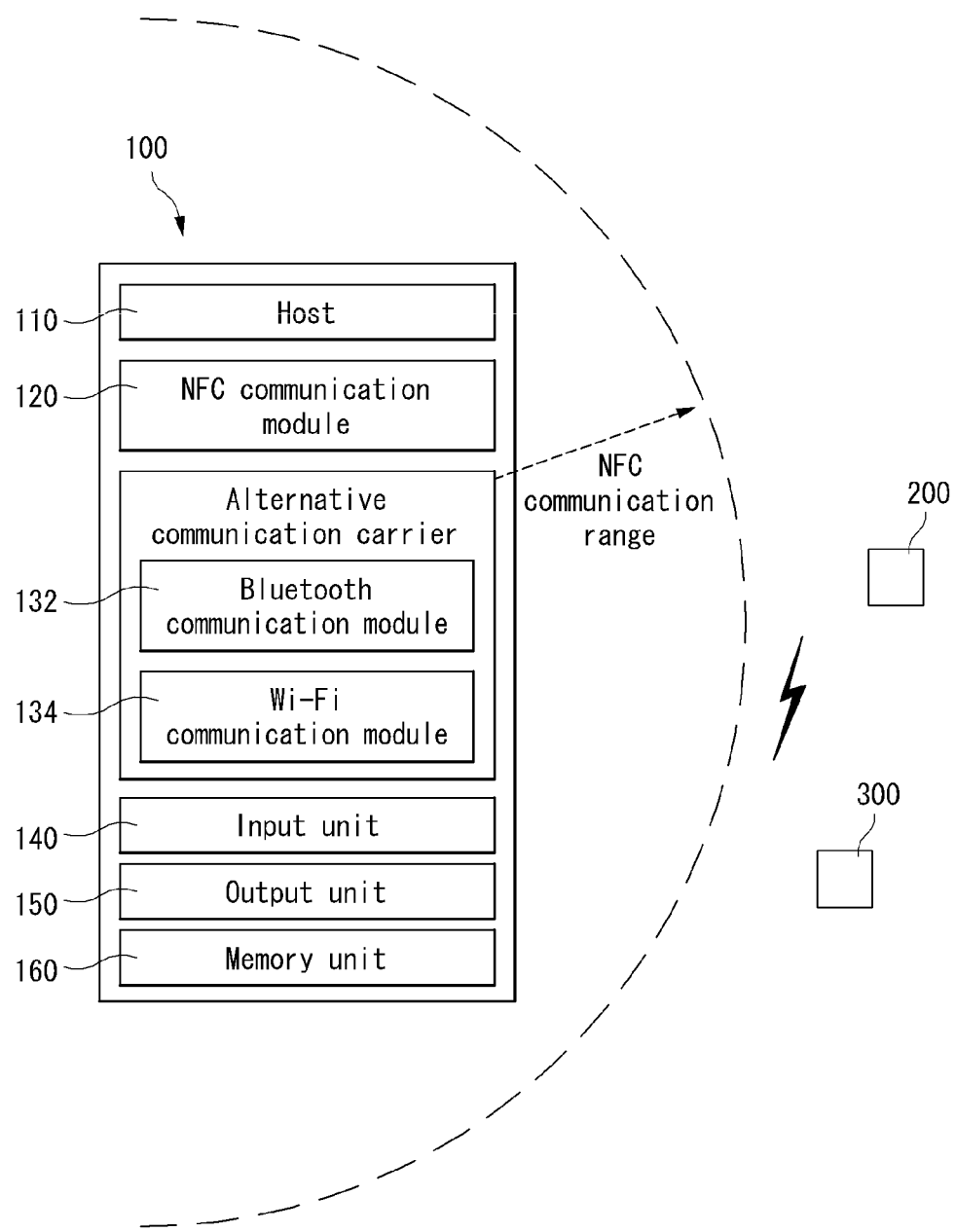
FIG. 1 shows a system environment according to an embodiment of the present invention.

The above and other objects, features, and advantages will be more apparent from the detailed description taken in conjunction with the accompanying drawings. Embodiments of the present invention will be described with reference to the accompanying drawings. Throughout the specification, the same reference numerals may be used to denote the same or substantially the same elements. The detailed description on known functions or configurations associated with the invention will be omitted when determined to render the gist of the invention unnecessarily unclear.

FIG. 1 shows a system environment according to an embodiment of the present invention.

The system environment may include one or more NFC electronic devices that may form an NFC link.

Referring to FIG. 1, the system environment may include one or more electronic devices 100, 200, and 300. This configuration is not necessary and thus more or less components may be included. As used herein, the electronic devices 100, 200 and 300 refer to any electronic devices that support NFC communication, such as, for example, NFC-supported mobile data processing devices (e.g., cell phones, smartphones, or e-book readers), printers, TVs, DTVs, computers, tablets, audio devices, or any other electronic devices. These are merely examples of the electronic devices and further various types of electronic devices may be included. Hereinafter, the electronic devices may be referred to as "NFC electronic devices".

As shown in FIG. 1, the electronic device 100 may include a host 110, an NFC communication module 120, and one or more alternative communication carriers.

The host 110 may provide a function of a process that controls the components of the electronic device 100. For example, the host 110 may receive and/or output various signals for controlling one or more alternative communication carriers and the NFC communication module 120 shown in FIG. 1. Hereinafter, the host 110 may be referred to as a processor 110 or a controller.

The NFC communication module 120 may allow the electronic device 100 to form an NFC link with the other electronic devices 200 and 300 that support NFC communication. The NFC communication module 120 may refer to an NFC forum device. As used herein, the NFC communication module may be referred to as a near field communication means.

As shown in FIG. 1, the NFC communication module 120 may form an NFC link by performing tagging with the NFC communication modules of the other electronic devices within an NFC communication range.

The NFC communication module 120 may communicate with the NFC communication modules of the other electronic devices 200 and 300 in various modes, such as, for example, a card emulation mode, a reader mode, a peer-to-peer mode.

When operating in the card emulation mode, the NFC communication module 120 of the electronic device 100 may function as a card, that is, a tag. In such case, the NFC communication modules of the other electronic devices may operate in the reader mode to obtain data from the NFC communication module 120 of the electronic device 100.

When operating in the reader mode, the NFC communication module 120 of the electronic device 100 may function as a reader. In this case, the NFC communication module 120 of the electronic device 100 may obtain data from the NFC communication modules of the other electronic devices.

When operating in the peer-to-peer mode, the NFC communication module 120 of the electronic device 100 may exchange data with the NFC communication modules of the other electronic devices.

The mode of the NFC communication module 120 may be determined according to a predetermined criterion. For example, the mode of the NFC communication module 120 may be set according to a user's entry or a predetermined algorithm.

The alternative communication carrier refers to a communication technology that may be used for data transmission between electronic devices. The alternative communication carrier may include various communication modules other than the NFC communication carrier. For example, as shown in FIG. 1, the alternative communication carrier may include at least one of a Bluetooth (802.15.1 IEEE) communication module 132 and a Wi-Fi (Wireless Fidelity) communication module 134. Besides, the alternative communication carrier may include various communication means such as an RFID (Radio Frequency Identification) communication module or a WiGig (Wireless Gigabit) communication module. Any communication means currently implemented or to be implemented in the future may also be included in the alternative communication carrier. Hereinafter, the alternative communication carrier may be referred to as an alternative carrier or a alternative communication means.

The electronic device 100 may include an input unit 140 to receive a user's input. For example, the input unit 140 may be at least one of a keyboard, a mouse, or a touchscreen.

Further, the electronic device 100 may include an output unit 150 to output information to the user. The output unit 150 may include at least one of a sound output unit to output a sound signal and a display unit to display an image.

Still further, the electronic device 100 may include a memory 160 to store various data.

The electronic devices 200 and 300 may each include a configuration corresponding to the electronic device 100. That is, the electronic devices 200 and 300 each may include a host, an NFC communication module, and an alternative communication carrier. Further, the electronic devices 200 and 300 each may further include at least one of the above-described input unit 140, output unit 150, and memory unit 160. The internal configurations of the electronic devices 200 and 300 are illustrated in FIGS. 2 to 5.

For convenience of description, as necessary, the electronic device 100 is referred to as a first electronic device 100, the electronic device 200 as a second electronic device 200, and the electronic device 300 as a third electronic device.

After forming the NFC link with the other electronic devices through the NFC communication module 120, the electronic device 100 changes the communication module to an alternative communication carrier to continue to perform data communication with the other electronic devices. As used herein, a series of procedures of allowing the electronic device 100 to be linked to the other electronic devices through the alternative communication carrier so that the electronic device 100 may keep communicating with the other electronic devices through the alternative communication carrier after the NFC link is formed are referred to as "handover".

In other words, the handover is to form an NFC link between the electronic device 100 and the other electronic devices and then form a link through the alternative communication carrier to perform data communication. A user may easily form an NFC link through NFC tagging between the electronic device 100 and the other electronic device, then changing communication means through the alternative communication carrier appropriate for transmission of a high capacity of data and/or data transmission in a longer distance than that of the NFC link.

Hereinafter, referring to the drawings, the handover according to an embodiment will be described in more detail. For convenience of description, the system environment shown in FIG. 1 is referred to. However, this is merely for ease of description, and the technical spirit of the invention is not limited to a particular environment or specific machine.

Figure 2:
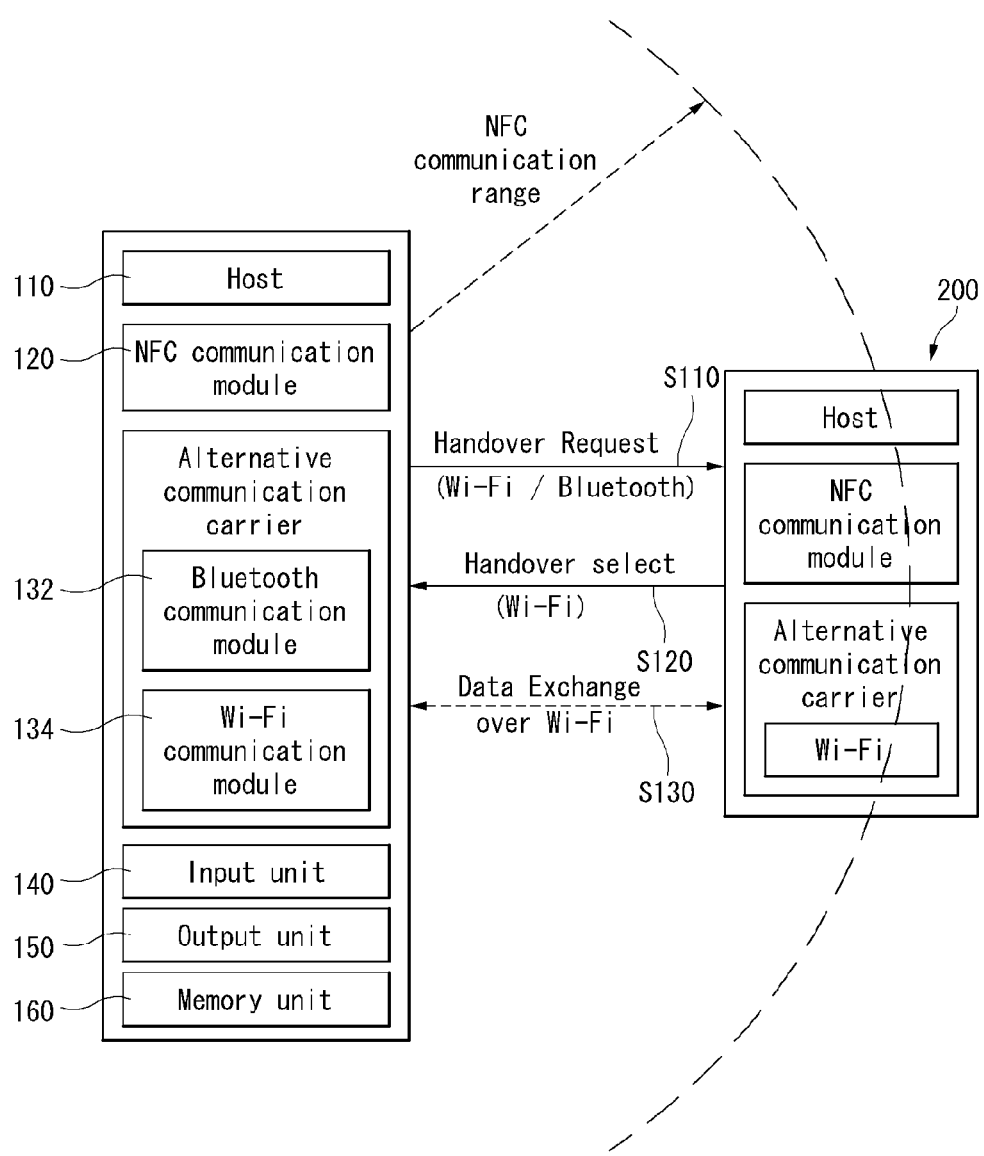
FIG. 2 is a view for describing the handover according to a first embodiment of the present invention.

FIG. 2 is a view for describing the handover according to a first embodiment of the present invention.

Referring to FIG. 2, the first electronic device 100 may transmit a handover request message to the second electronic device 200 (S110).

Prior to step S110, the first electronic device 100 and the second electronic device 200 positioned within an NFC communication range may form an NFC link through tagging.

The first electronic device 100 may transfer a message for requesting handover, e.g., the handover request message, to the second electronic device 200 through the NFC link thusly formed.

The first electronic device 100 may transmit the handover request message to the second electronic device 200, and the second electronic device 200 may initiate a protocol for changing the NFC link formed between the first electronic device 100 and the second electronic device 200 into another carrier.

Specific information included in the handover request message will be described later.

Here, the first electronic device 100 may serve as a handover requester, and the second electronic device 200 may serve as a handover selector. The handover requester refers to a device that starts a handover protocol by transmitting the handover request message to another NFC electronic device, and the handover selector refers to an NFC device that configures a handover selection message and responds to the handover request message. That is, the handover requester (i.e., a device of requesting a handover) and the handover selector (i.e., a device of selecting a handover) are relative concepts that are defined depending on whether to transmit a handover request message or handover selection message. Accordingly, depending on the situation, when the second electronic device 200 transmits a handover request message to the first electronic device 100, the first electronic device 100 becomes the handover selector, and the second electronic device 200 becomes the handover requestor.

The handover request message may include information associated with an alternative carrier supported by the first electronic device 100. For example, as shown in FIG. 1, since the first electronic device 100 supports Bluetooth and Wi-Fi, the handover request message may include information on Bluetooth and Wi-Fi supported by the first electronic device 100. A specific data format included in the handover request message will be described later.

Priorities may be assigned to a plurality of alternative carriers. For example, as shown in FIG. 2, the handover request message puts information on an alternative carrier having a higher priority at the front and information on an alternative carrier having a lower priority at the rear. Referring to the handover request message illustrated in FIG. 2, it can be seen that Wi-Fi, an alternative carrier, has a higher priority than Bluetooth. Or, there may be a separate field in which a priority of each carrier is filled.

Receiving the handover request message, the second electronic device 200 may transmit a response to the handover request message to the first electronic device 100 (S120).

For example, the second electronic device 200 may generate a handover selection message as an example of a response to the handover request message through the NFC link and may transmit the generated handover selection message to the first electronic device 100.

The second electronic device 200 may determine which alternative carrier is supported by the second electronic device 200 among the alternative carriers included in the handover request message and depending on the determination may provide information on the alternative carrier supported by the second electronic device 200 to the first electronic device 100. That is, the alternative carrier included in the handover selection message may include information on the alternative carrier supported by the second electronic device 200 among the alternative carriers supported by the first electronic device 100.

As shown in FIG. 2, the second electronic device 200 supports Wi-Fi as an alternative carrier, but not Bluetooth.

In such case, the handover selection message may include information on a Wi-Fi communication module supported by the second electronic device 200 as information on the alternative carrier.

Specific information included in the handover selection message will be described later.

The first electronic device 100 may perform data communication with the second electronic device 200 through the alternative carrier (S130).

For this, the first electronic device 100 may obtain information on the alternative carrier supported by the second electronic device 200 by receiving the handover selection message from the second electronic device 200. For example, the first electronic device 100 may identify that the alternative carrier supported by the second electronic device 200 as obtained is Wi-Fi.

Accordingly, based on the information obtained by transmission and reception of the handover request message and the handover selection message, the first electronic device 100 may perform a series of procedures for handover to a carrier other than the second electronic device 200. By doing so, the first electronic device 100 and the second electronic device 200 may switch from the NFC link to the Wi-Fi link and may continue to perform communication based on the Wi-Fi protocol.

As the link between the first electronic device 100 and the second electronic device 200 switches from the NFC link to the Wi-Fi link, although not positioned in the NFC communication range any longer, the first electronic device 100 and the second electronic device 200 may still perform data communication and exchange data at a higher speed than that of the NFC link.

In other words, in the case that the first electronic device 100 is a smartphone, a user may place his smartphone near the second electronic device 200 so that the smartphone may conduct tagging with the second electronic device 200, thus forming an NFC link and performing the handover protocol to thereby change the link means to Wi-Fi. Since the link means is changed, even when the user brings his smartphone out of the NFC communication range, the smartphone may continue to perform data communication with the second electronic device 200 through Wi-Fi.

The handover process described in connection with steps S110 to S130 are hereinafter referred to as "negotiated handover". That is, the negotiated handover refers to exchange of messages for agreement on the alternative carrier used for data exchange between two first NFC electronic devices 100, e.g., the electronic devices 100 and 200.

Figure 3:
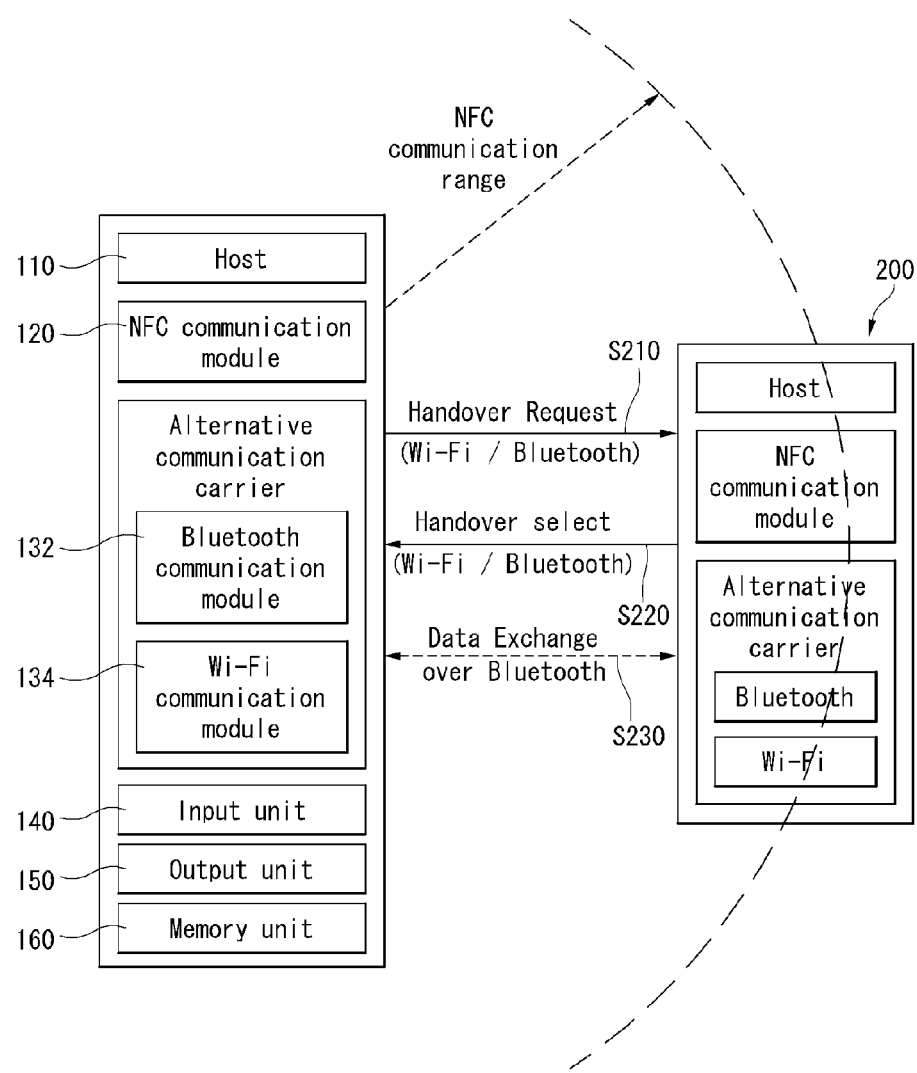
FIG. 3 is a view for describing a handover according to a second embodiment of the present invention.

FIG. 3 is a view for describing a handover according to a second embodiment of the present invention.

In describing the handover according to the second embodiment, what is substantially the same as the first embodiment will not be repeatedly described.

Referring to FIG. 3, the third electronic device 300, unlike the second electronic device 200 shown in FIG. 2, may simultaneously support a plurality of alternative carriers, for example, Bluetooth and Wi-Fi.

The first electronic device 100 may transmit a handover request message to the third electronic device 300 (S210). In other words, the first electronic device 100 becomes a handover requester, and the third electronic device 300 becomes a handover selector. Step S210 is the same as step S110 described in connection with FIG. 2, and the description will be omitted.

The third electronic device 300 may transmit a handover selection message to the first electronic device 100 in response to the handover request message (S220).

The handover selection message transmitted by the third electronic device 300 may include information on Wi-Fi and Bluetooth which are alternative carriers. Also, the handover selection message, as shown in FIG. 3, places Wi-Fi before Bluetooth, thereby assigning a higher priority to Wi-Fi.

The first electronic device 100 may communicate with the third electronic device 300 through the alternative carrier (S230).

The first electronic device 100 may judge that the third electronic device 300 supports a plurality of alternative carriers based on the handover selection message obtained in step S120.

When the handover selector, i.e., the third electronic device 300, supports the plurality of alternative carriers, the first electronic device 100 may select one or all of the plurality of alternative carriers. Further, when selecting one of the alternative carriers, the first electronic device 100 may make the selection depending on the priorities of the alternative carriers designated by the third electronic device 300 or may select its preferred one irrespective of such priorities.

Referring to FIG. 3, the first electronic device 100 may select Bluetooth as the alternative carrier regardless of the priorities assigned to the alternative carriers by the third electronic device 300.

Figure 4:
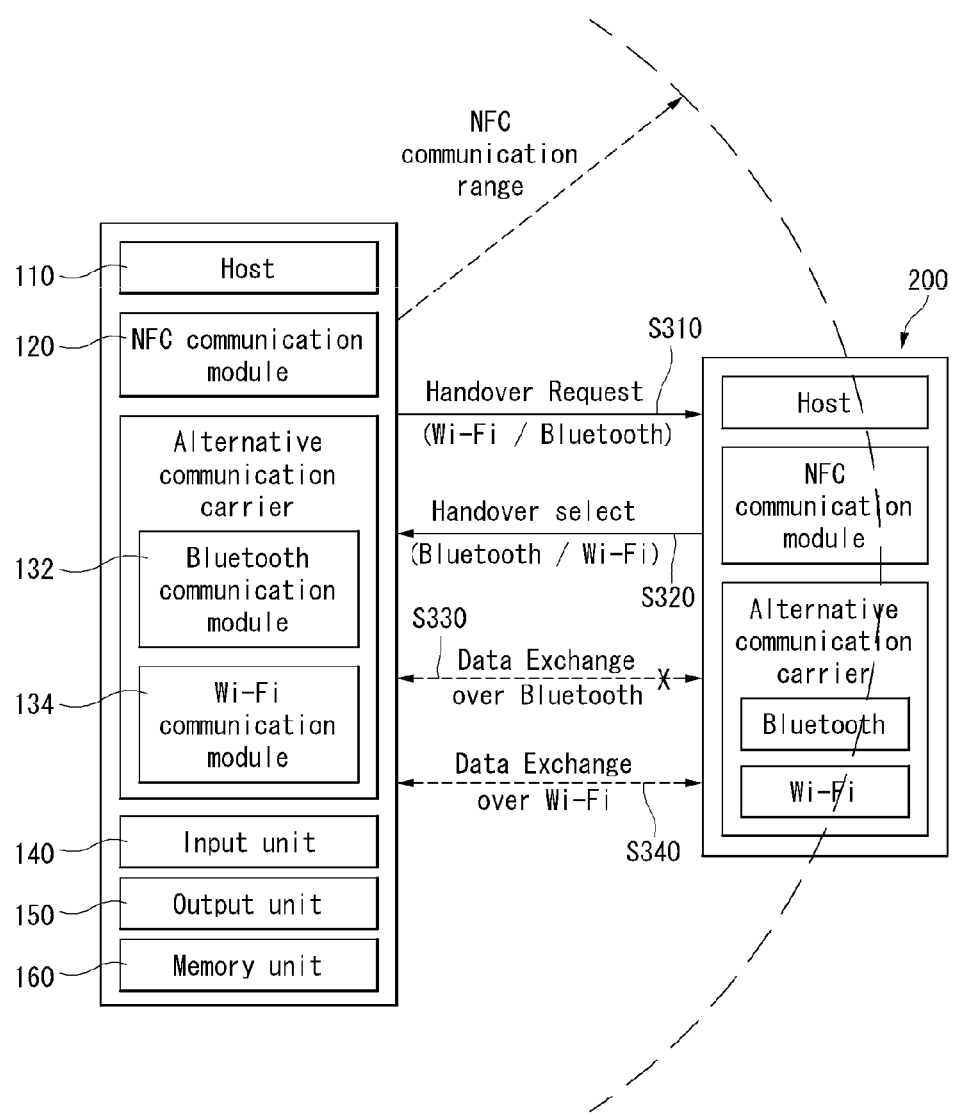
FIG. 4 is a view for describing a handover according to a third embodiment of the present invention.

FIG. 4 is a view for describing a handover according to a third embodiment of the present invention.

Step S310 of FIG. 4 is the same as step S210 of FIG. 3 and thus the detailed description will be omitted.

The third electronic device 300 may transmit a handover selection message to the first electronic device 100 (S330). At this time, as shown in FIG. 4, the handover selection message may assign a higher priority to Bluetooth than Wi-Fi.

In such case, the first electronic device 100 may first attempt Bluetooth pairing depending on the priorities designated by the third electronic device 300 which is a handover selector among a plurality of alternative carriers (S330).

The Bluetooth pairing may fail due to various causes. For example, while the handover protocol is in progress, if the first electronic device 100 and the third electronic device 300 are positioned out of a range of Bluetooth signals, the Bluetooth pairing may not succeed.

Meanwhile, while the handover protocol goes on, if the first electronic device 100 and the third electronic device 300 are positioned within the range of Bluetooth signals so that handover to Bluetooth occurs and while data exchange is conducted through the Bluetooth link, at least one of the first electronic device 100 and the third electronic device 300 is on the move so that the devices 100 and 300 end up departing from the Bluetooth signal range, the Bluetooth link may fail.

At this time, the first electronic device 100 may continue to perform data communication with the third electronic device 300 through Wi-Fi which is an alternative carrier with the next priority (S340).

Figure 5:
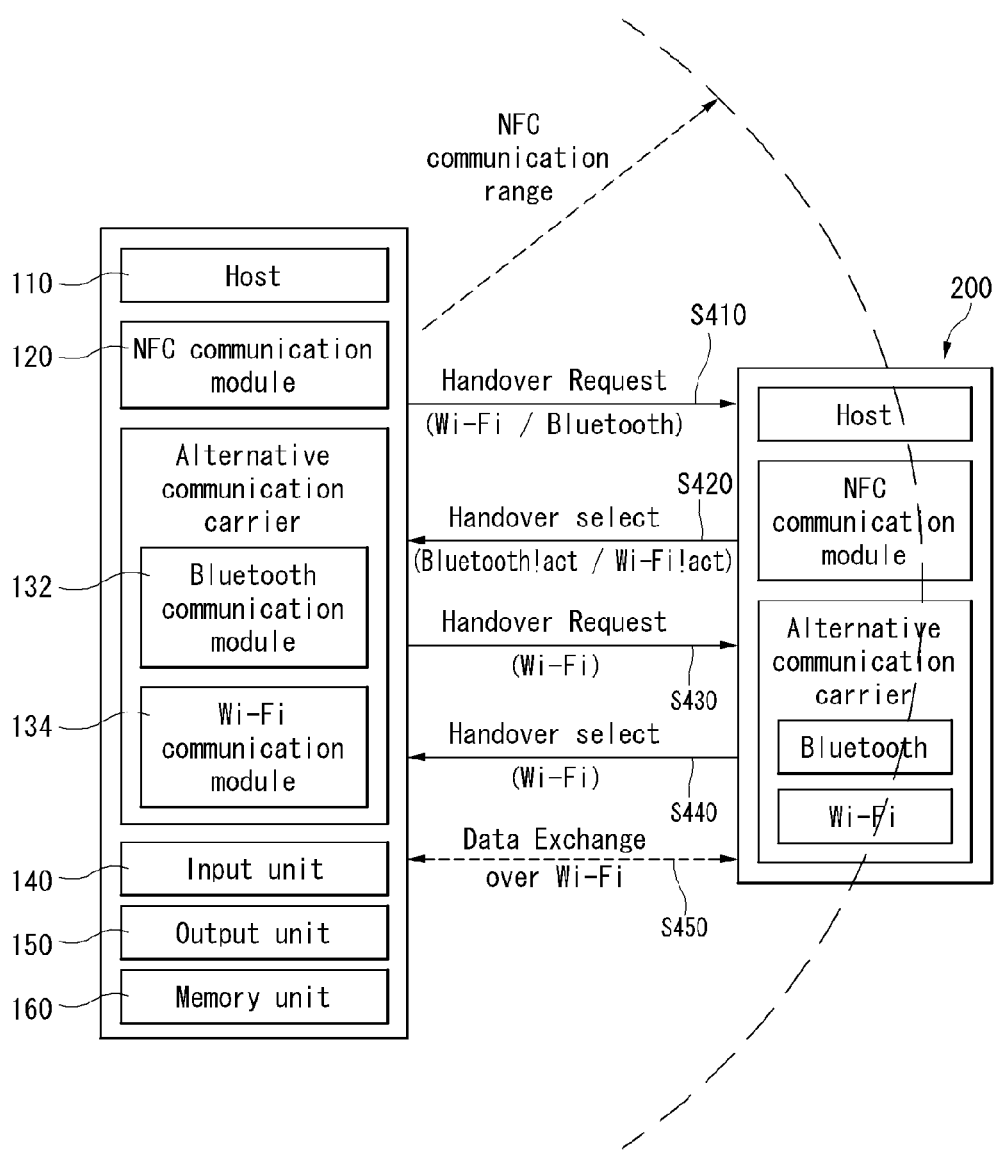
FIG. 5 is a view for describing a handover according to a fourth embodiment of the present invention.

FIG. 5 is a view for describing a handover according to a fourth embodiment of the present invention.

Step S410 of FIG. 5 is the same as step S310 of FIG. 4 and thus the detailed description will be omitted.

Referring to FIG. 5, the third electronic device 300 may transmit a handover selection message to the first electronic device 100 in response to a handover request message received from the first electronic device 100 (S420).

The handover selection message may include power condition information of alternative carriers provided by the third electronic device 300.

For example, if among alternative carriers supported by the first electronic device 100 are the alternative carrier supported by the third electronic device 300, then a power condition of each of the alternative carriers supported by the third electronic device 300—for example, information on activation or inactivation—may be transmitted from the third electronic device 300 to the first electronic device 100.

For example, as shown in FIG. 5, the handover selection message may include information indicating that Bluetooth and Wi-Fi, which are alternative carriers of the first electronic device 100, remain inactivated.

When the received handover selection message includes information on the plurality of alternative carriers, the first electronic device 100 may select any alternative carrier as described above. In this embodiment, it is assumed that the first electronic device 100 selects Wi-Fi as the alternative carrier.

The first electronic device 100 re-transmits the handover request message to the third electronic device 300 (S430). The handover request message transmitted in step S430 may designate one of the received plurality of alternative carriers. That is, the first electronic device 100 may designate Wi-Fi as the alternative carrier in step S430 and may transmit to the third electronic device 300 a handover request message designating Wi-Fi only as the alternative carrier, so that the Wi-Fi module of the third electronic device 300 may be activated.

In response to the handover request message received in step S430, the third electronic device 300 may activate power of the Wi-Fi module and may transmit a message responding to the handover request message received in step S430 to the first electronic device 100 (S440).

The first electronic device 100 may perform data exchange with the first electronic device 100 through Wi-Fi (S450).

In other words, when the Wi-Fi module of the third electronic device 300 is activated, the first electronic device 100 may form a Wi-Fi link with the third electronic device 300. That is, the first electronic device 100 may hand the NFC link with the third electronic device 300 over to the Wi-Fi link.

According to the embodiment described in connection with FIG. 5, the third electronic device 300, which is a handover selector, leaves the power of the alternative carrier inactivated until a specific alternative carrier is selected from the plurality of alternative carriers, thereby saving power.

Figure 6:
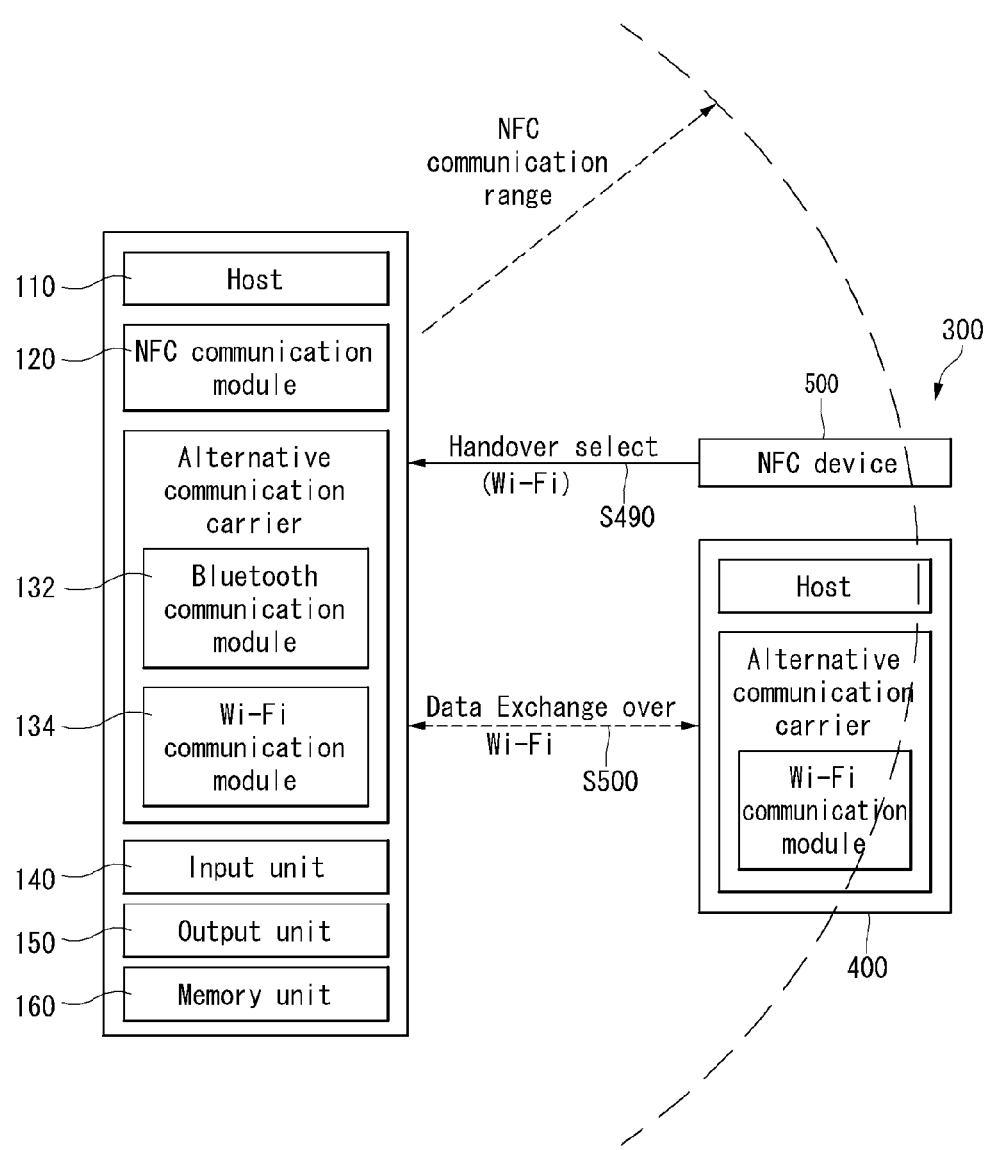
FIG. 6 is a view for describing a handover according to a fifth embodiment of the present invention

FIG. 6 is a view for describing a handover according to a fifth embodiment of the present invention.

In the handover according to the fifth embodiment of the present invention, unlike the handover selector the handover, the handover selector may be constituted of two separate configurations. That is, in the fifth embodiment, the handover selector may be separated into a fourth electronic device 400 and an NFC device 500.

As shown, the fourth electronic device 400 may include a host and an alternative communication carrier. For example, the alternative communication carrier may be a Wi-Fi communication module.

Further, the fourth electronic device 400 does not include the NFC device 500. That is, the fourth electronic device 400 does not support an NFC communication function and thus may not form an NFC connection with the first electronic device 100.

The NFC device 500 shown in FIG. 6 may include information for accessing Wi-FI of the fourth electronic device 400. The NFC device 500 may include, as a handover selection message, the information necessary for accessing Wi-Fi of the fourth electronic device 400. The handover selection message may include a handover selection record and additional information to be described later.

The first electronic device 100 may receive the handover selection message from the NFC device 500 by performing tagging to the NFC device 500 (S490).

Receiving the handover selection message, the first electronic device 100 may form a Wi-Fi connection with the fourth electronic device 400 based on the handover selection message (S500).

Unlike the negotiated handover described earlier, the handover described in connection with FIG. 6 is referred to as "static handover".

A variety of handover processes have been so far described according to several embodiments. Hereinafter, a handover request collision that may occur during the course of handover and a solution thereto will be described in greater detail.

Figure 7:
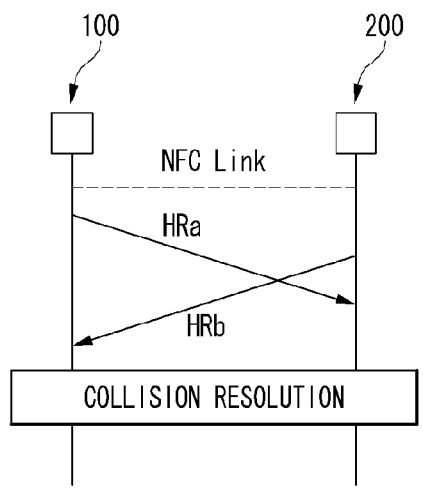
FIG. 7 is a view for describing a handover request collision according to an embodiment of the present invention.

FIG. 7 is a view for describing a handover request collision according to an embodiment of the present invention.

As used herein, the "handover request collision" refers to a situation where after an NFC link is formed between the first electronic device 100 and the second electronic device 200, the first electronic device 100 transmits a handover request message to the second electronic device 200, and the second electronic device 200 transmits a handover request message to the first electronic device 100—that is, both the first electronic device 100 and the second electronic device 200 send out respective handover request messages. In the embodiment described in connection with FIGS. 2 to 5, an electronic device functions as a handover requester, and its counterpart electronic device functions as a handover selector. However, when the handover request collision takes place, both the electronic devices function as the handover requesters.

Specifically, referring to FIG. 7, while an NFC link is formed between the first electronic device 100 and the second electronic device 200, the first electronic device 100 transmits a first handover request message HRa to the second electronic device 200 (S510).

The second electronic device 200 also transmits a second handover request message HRb to the first electronic device 100 (S520).

Based on the description made in connection with FIGS. 2 to 3, receiving the first handover request message HRa, the second electronic device 200 should transmit a handover selection message to the first electronic device 100 in response to the first handover request message HRa. However, since the second electronic device 200 transmits the second handover request message HRb to the first electronic device 100, a handover request collision occurs between the first electronic device 100 and the second electronic device 200 that both serve as the handover request devices.

In such case, one of the first electronic device 100 and the second electronic device 200 should be a handover selector. It is hereinafter referred to as "handover collision resolution" to determine which one of the first electronic device 100 and the second electronic device 200 is to be the handover selector.

The first electronic device 100 and the second electronic device 200 performs a handover collision resolution process (S530), which will be described below in more detail.

On the other hand, when receiving a handover request message from another electronic device before sending its own handover request message to the other electronic device, the first electronic device 100 processes the handover request message received from the other electronic device without sending its own handover request message to the other electronic device—that is, the first electronic device 100 plays a role as a handover selector—thereby achieving the handover process.

Hereinafter, the handover collision resolution performed by the first electronic device 100 and the second electronic device 200 in step S530 will be more specifically described. The handover collision resolution may be conducted by various methods. This will be described in detail with reference to the drawings.

Figure 8:
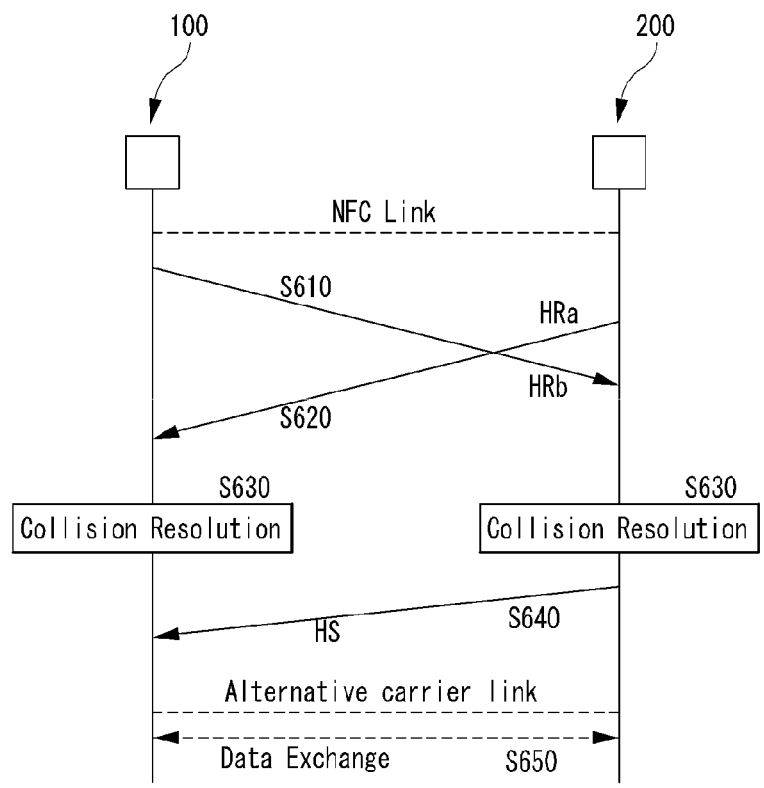
FIG. 8 is a view for describing a method of resolving the handover request collision according to a first embodiment of the present invention.

FIG. 8 is a view for describing a method of resolving the handover request collision according to a first embodiment of the present invention. In describing steps S610 and S620 of FIG. 8, what are the same as those described in connection with steps S510 and S520 will not be repeatedly described. Also, for ease of description, it is assumed that there is a handover request collision between the first electronic device 100 and the second electronic device 200. However, this is merely an example, and the technical spirit of the invention is not limited to a specific device.

The first electronic device 100 and the second electronic device 200 perform a handover request collision resolution (S630). That is, the first electronic device 100 and the second electronic device 200 may each perform the handover request collision resolution. Hereinafter, for convenience of description, the handover request collision solution by the first electronic device 100 is described, but the handover request collision resolution process may be also performed by the second electronic device 200 in the same manner.

The first electronic device 100 may compare a specific field value included in the first handover request message HRa transmitted with a specific field value included in the second handover request message HRb received.

For example, the specific field value may include a random number.

Specifically, when transmitting the first handover request message HRa to the second electronic device 200 in step S610, the first electronic device 100 generates the random number, includes the random number in the specific field value of the first handover request message HRa, and transmits the first handover request message HRa.

Upon transmitting the second handover request message HRb to the first electronic device 100 in step S620, the second electronic device 200 may also generate a random number and transmit the second handover request message HRb with the random number included in the specific field value of the second handover request message HRb.

By doing so, each of the first electronic device 100 and the second electronic device 200 may obtain the random numbers included in the handover request message received from its counterpart device and the handover request message transmitted to its counterpart device and may compare the random numbers with each other.

The first electronic device 100 may determine whether to function as a handover requester or handover selector by comparing the random number included in the first handover request message HRa transmitted to the second electronic device 200 with the random number included in the second handover request message HRb received from the second electronic device 200.

Depending on whether the two random numbers are identical to or different from each other, the first electronic device 100 may perform the following steps.

For example, when the two random numbers are the same as each other, the first electronic device 100 may re-transmit the handover request message to the second electronic device 200. The first electronic device 100 re-generate a random number and transmits the re-generated random number to the second electronic device 200 with the re-generated random number included in the specific field of the handover request message.

When the two random numbers are different from each other, the electronic device that has transmitted a handover request message having a higher priority may serve as the handover requester.

More specifically, to determine the priority, the first electronic device 100 may consider one or more bit values included in the transmitted first handover request message HRa and the received second handover request message HRb. For example, the one or more bit values may be bit values included at the same position in the random number.

That is, the first electronic device 100 may determine whether to function as the handover requester or handover selector depending on a result of comparing a specific bit value of the random number with a specific bit value of the received random number.

For example, the first electronic device 100 may determine based on the comparison result of the specific bit values whether the specific bit value transmitted from the first electronic device 100 is identical to or different from the specific bit value received from the second electronic device 200 and may determine whether to serve as the handover selector based on the result of the determination and the magnitudes of the transmitted random number and the received random number.

More specifically, for example, in the case that the comparison result of the specific bit values shows that the specific bit values are the same as each other, when the random number generated by the first electronic device 100 is larger than the random number generated by the second electronic device 200, the first electronic device 100 may function as the handover selector. In such case, since the specific bit values are the same as each other and the second electronic device 200 generates the random number smaller than that generated by the first electronic device 100, the second electronic device 200 may function as the handover requester.

Meanwhile, in the case that the comparison result of the specific bit values shows that the specific bit values are different from each other, when the random number generated by the first electronic device 100 is larger than the random number generated by the second electronic device 200, the first electronic device 100 may function as the handover requester. In such case, since the specific bit values are different from each other and the second electronic device 200 generates the random number smaller than that generated by the first electronic device 100, the second electronic device 200 may function as the handover selector.

That is, it may be determined which device is the handover requester or handover selector in consideration of both the comparison result of the specific bit values and the magnitudes of the random numbers, so that a device generating a larger/smaller random number may be prevented from being unconditionally selected as the handover requester or handover selector.

Hereinafter, it is assumed based on the handover request collision resolution that the first electronic device 100 functions as the handover requester, and the second electronic device 200 functions as the handover selector.

In response to the first handover request message HRa received in step S610, the second electronic device 200 may transmit a handover selection message to the first electronic device 100 (S640).

On the other hand, since the first electronic device 100 has been selected to function as the handover requester according to the handover request collision resolution, the first electronic device 100 does not respond to the second handover request message HRb received from the second electronic device 200 in step S620.

According to the handover selection message received from the second electronic device 200 in step S640, the first electronic device 100 may complete the handover process (S650). In other words, by performing the same process as the handover process described in connection with FIGS. 2 to 5, the first electronic device 100 may complete the handover process. Thus, the first electronic device 100 and the second electronic device 200 may exchange data through the alternative communication means.

Therefore, according to the embodiment described in connection with FIGS. 7 and 8, the collision that may occur during the course of the handover process may be effectively resolved.

Hereinafter, a data structure according to an embodiment of the present invention will be described in detail with reference to the drawings. The data structure is merely an example, and the technical spirit of the invention is not limited to a specific data structure.

Figure 9:
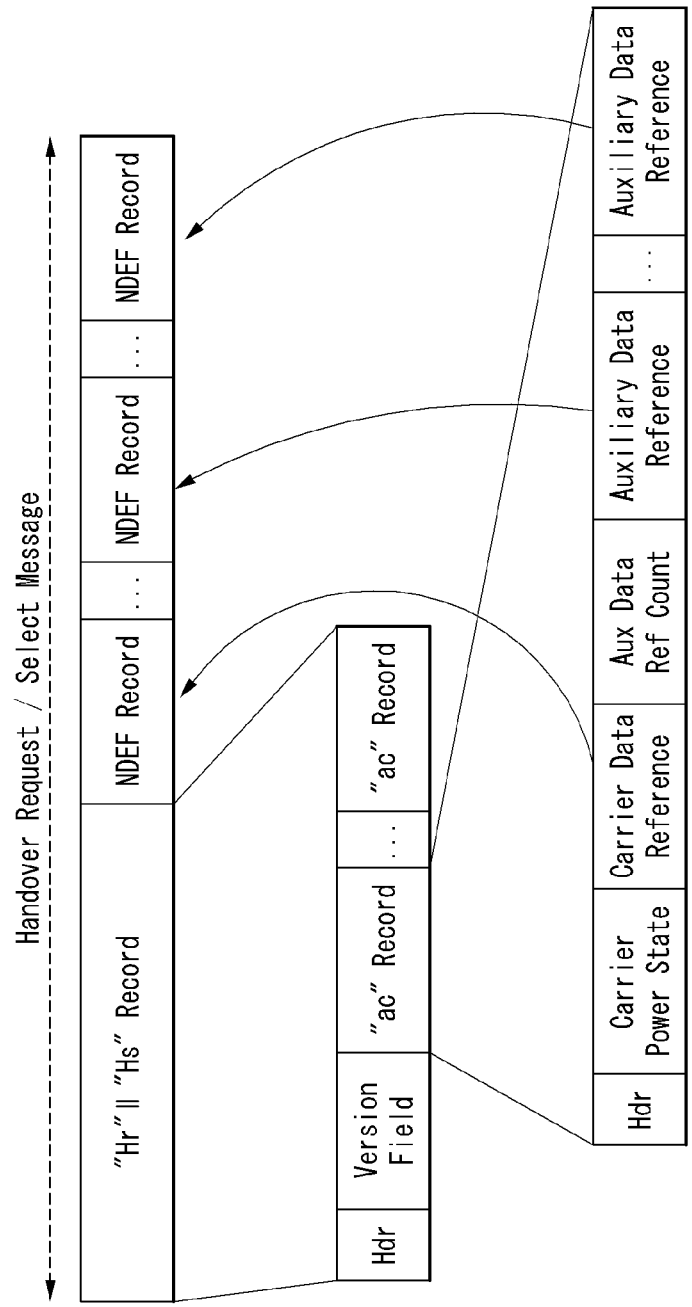
FIG. 9 illustrates a structure of a handover message according to an embodiment of the present invention.

FIG. 9 illustrates a structure of a handover message according to an embodiment of the present invention. As illustrated earlier in FIGS. 2 to 8, the message used in the handover process may include a handover request message and a handover selection message.

Referring to the upper part of FIG. 9, the handover request message according to an embodiment of the present invention may include a handover request record (hereinafter, "Hr record") and one or more NDEF (NFC Data Exchange Format) records. Also, the handover selection message (hereinafter, "Hs record") may include a handover selection record and one or more NDEF records.

The NDEF records may include specific information on the alternative carrier.

Specifically, various types of information may be included in the NDEF records of the handover request message.

For example, the NDEF records may include information for identifying an alternative communication link. That is, the handover carrier record may provide the handover selector with information on what alternative communication means is supported by the handover requester. As used herein, the NDEF record including the information for identifying an alternative communication link is referred to as a "handover carrier record".

Meanwhile, the NDEF records may include environment setup information for forming an alternative communication link. As used herein, the NDEF record including environment setup information necessary for forming an alternative communication link, such as a password or an address, is referred to as a "carrier environment setup record".

The carrier environment setup record may also include information for identifying what the alternative communication means is.

The handover carrier record and the carrier environment setup record will be described later in greater detail.

Referring to the middle part of FIG. 9, the handover request/selection record according to an embodiment of the present invention may include at least one of a header Hdr, a version field, and one or more alternative carrier records (hereinafter, "ac record"), and the alternative carrier records may define an alternative carrier requested/selected by the handover request/selection message. Further, the handover request/selection record may include more or less information fields that those illustrated therein.

Referring to the lower part of FIG. 9, the ac record according to an embodiment of the present invention may include at least one of a header Hdr, a carrier power state, a carrier data reference, an auxiliary data reference count, and information fields of one or more auxiliary data references.

The carrier data reference and the auxiliary data references may indicate their corresponding NDEF records as illustrated in the upper part of FIG. 9.

Hereinafter, the above-referenced information will be described in greater detail.

Figure 10:
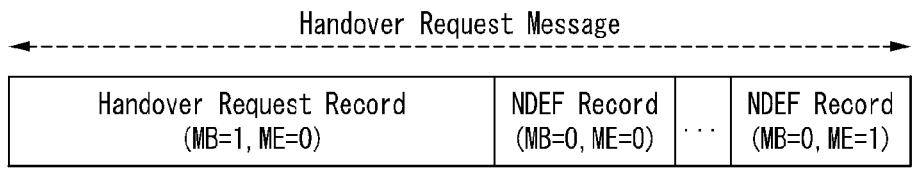
FIG. 10 illustrates an example of a handover request message according to an embodiment of the present invention.

FIG. 10 illustrates an example of a handover request message according to an embodiment of the present invention.

As described in connection with FIGS. 2 to 8, the handover request message may be used for the handover requester to provide the handover selector with information for an alternative carrier supported by the handover requester.

The handover request message may include the handover request record and one or more NDEF records. For example, the handover request message may start with the handover request record and terminate with the NDEF record.

Specifically, the handover request message may start with the handover request record including a flag set as a message beginning MB and may terminate with the NDEF record with a flag set as a message end ME.

Since the handover request message should include at least one alternative carrier, it cannot have a record with both the MB and ME flags set.

The NDEF record may be one of the handover carrier record and the carrier environment setup record depending on characteristics of the alternative carrier. Also, the NDEF record may be configured as auxiliary data. The NDEF record will be described later more specifically.

Figure 11:
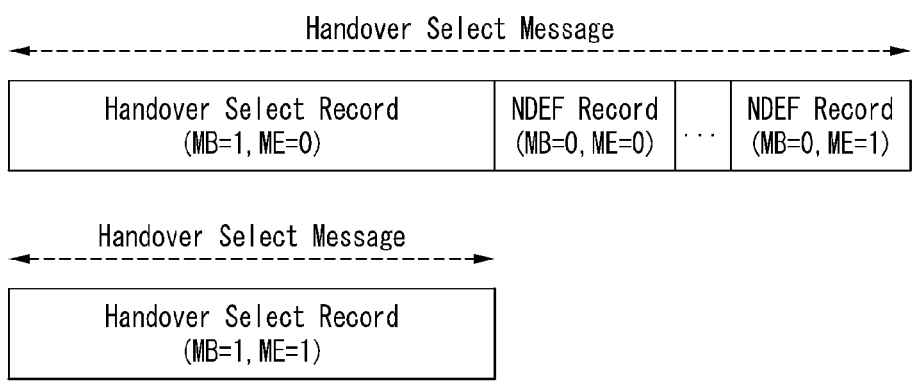
FIG. 11 illustrates an example of a handover selection message according to an embodiment of the present invention.

FIG. 11 illustrates an example of a handover selection message according to an embodiment of the present invention.

As described in connection with FIGS. 2 to 8, the handover selection message may be used for the handover selector to provide the handover requester with information for an alternative carrier supported by the handover selector among alternative carriers included in the handover request message received from the handover requester.

Referring to the upper part of FIG. 11, the handover selection message may have the same structure as that of the handover request message described in connection with FIG. 10.

Further, referring to the lower part of FIG. 11, the handover selection message may include a single record with both a message beginning MB and a message end ME set. That is, in such case, none of the alternative carriers supported by the handover requester are supported by the handover selector.

Hereinafter, the handover request record illustrated in FIGS. 9 and 10 will be described in greater detail.

Figure 12:
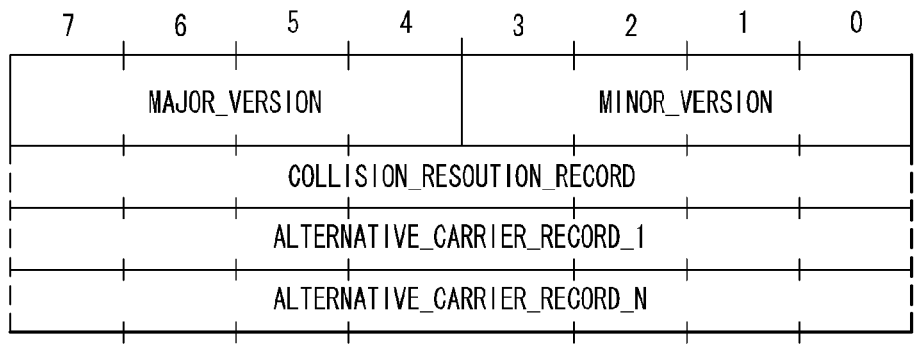
FIG. 12 illustrates an example of a handover request record according to an embodiment of the present invention.

FIG. 12 illustrates an example of a handover request record according to an embodiment of the present invention.

The handover request record may include a list of alternative carriers that may be used by the handover requester for communication with the handover selector.

The handover request record may indicate at least one or more alternative records.

Referring to FIG. 12, the handover request record may include information on at least one of major version, minor version, collision resolution record, and alternative carrier records 1 to n.

The collision resolution record may include random numbers for resolving the handover request collision as described in connection with FIG. 8.

Each alternative carrier record may specify an alternative carrier supported by the handover requester for communication between the handover selector and the handover requester. Information on the alternative carrier specified by each alternative carrier record may be included in the NDEF record of the handover request message.

Hereinafter, the handover selection record illustrated in FIGS. 9 and 11 will be described in greater detail.

Figure 13:
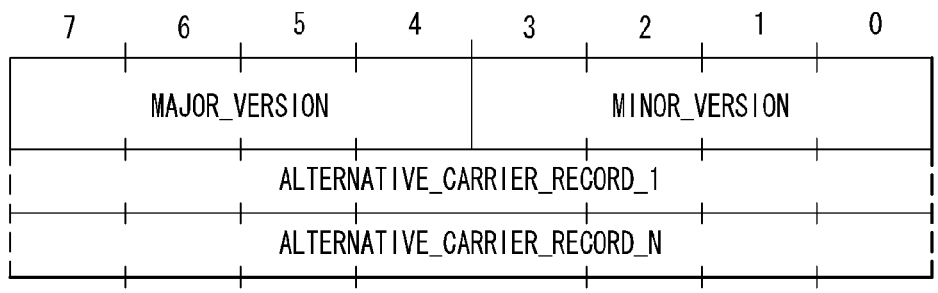
FIG. 13 illustrates an example of a handover selection record according to an embodiment of the present invention.

FIG. 13 illustrates an example of a handover selection record according to an embodiment of the present invention.

The handover selection record may include information on the alternative carrier supported by the handover selector among the alternative carriers included in the handover request message received from the handover requester by the handover selector.

As shown in FIG. 13, the handover selection record may include information on at least one of major version, minor version, and alternative carrier records 1 to n.

The alternative carrier records of the handover selection record may include information on the alternative carrier supported by both the handover requester and the handover selector.

Also, the order of the alternative carriers included in the handover selection record may refer to the order of priorities of the alternative carriers preferred by the handover selector. For example, the alternative carrier indicated by the alternative carrier record 1 may have a higher priority than that of the alternative carrier indicated by the alternative carrier record n. This may apply to the embodiment described in connection with FIGS. 3 to 5.

Hereinafter, the handover carrier record, which is an example of the NDEF record illustrated in FIGS. 9 and 10, will be described in greater detail.

Figure 14:
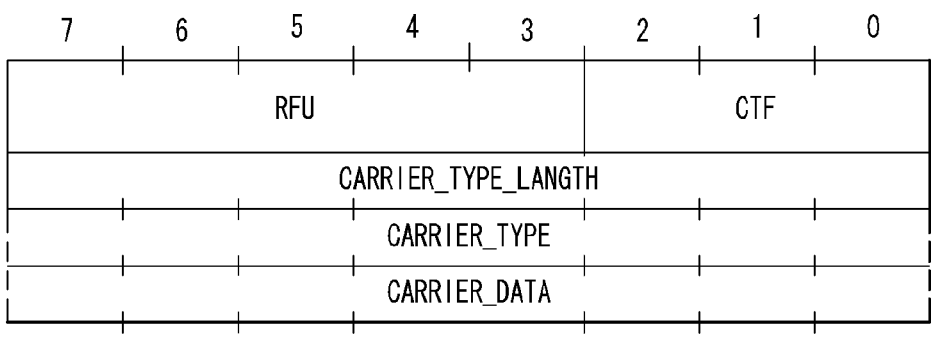
FIG. 14 illustrates an example of a handover carrier record according to an embodiment of the present invention.

FIG. 14 illustrates an example of a handover carrier record according to an embodiment of the present invention.

The handover carrier record may include information for identifying an alternative carrier.

Referring to FIG. 14, the handover carrier record may include at least one of a carrier type format (hereinafter, "CTF"), a carrier type length, a carrier type, and carrier data.

The carrier type format may indicate a structure of a value written in the carrier type to be described later.

For example, the carrier type format may correspond to at least one of an NFC Forum well-known type, a media-type defined in RFC 2046, an absolute URI defined in RFC 3986, and an NFC external type.

The carrier type length may refer to the length of the carrier type to be described later.

The carrier type may provide a unique identifier for an alternative carrier. The value of the carrier type should follow a structure, encoding, and format according to the carrier type format.

Based on at least one of the carrier type format, carrier type length, and carrier type—more specifically, the carrier type, the handover selector may identify what alternative carrier is supported by the handover requester.

The carrier data may include additional information on the alternative carrier.

Meanwhile, the handover carrier record may be included in the handover request message as the NDEF record of the handover request message. Receiving the handover carrier record, the handover selector may transmit to the handover requester environment setup information for the alternative carrier identified by the handover carrier record, for example, the handover selection message including the carrier environment setup record. Receiving the carrier environment setup record, the handover requester may perform handover according to the environment setup information included in the carrier environment setup record.

Hereinafter, the alternative carrier record (ac Record) illustrated in FIGS. 9 and 13 will be described in greater detail.

Figure 15:
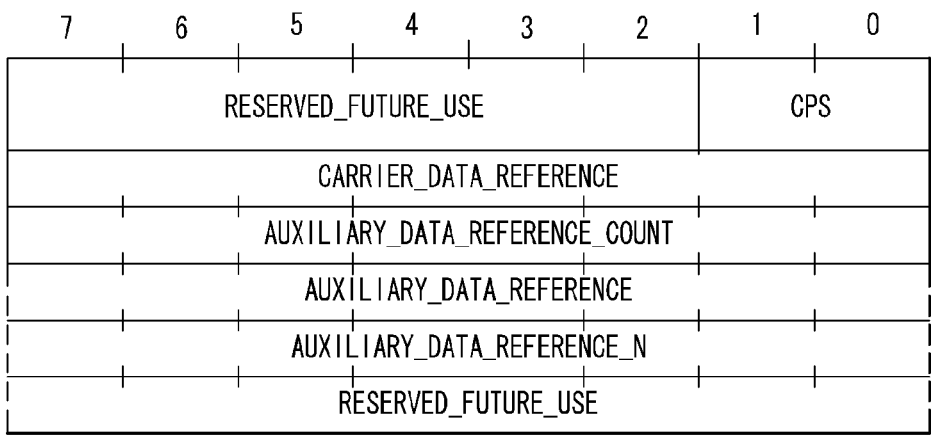
FIG. 15 illustrates an example of an alternative carrier record according to an embodiment of the present invention.

FIG. 15 illustrates an example of an alternative carrier record according to an embodiment of the present invention.

The alternative carrier record may be included in the handover request record or the handover selection record.

As shown in FIG. 15, the alternative carrier record may include at least one of a carrier power state CPS, a carrier data reference CARRIER_DATA_REFERENCE, an auxiliary data reference count AUXILIARY_DATA_REFERENCE_COUNT, and auxiliary data references 1 to n AUXILIARY_DATA_REFERENCE 1 TO N.

The carrier power state refers to the power state of the alternative carrier. The carrier power state may be at least one of, e.g., "inactivated", "activated", "under activation", and "unknown".

The carrier power state may apply to step S420 described in connection with FIG. 5.

The carrier data reference may provide a function of indicating the NDEF record illustrated in the upper part of FIG. 9. As described earlier, the NDEF record may be the handover carrier record or carrier environment setup record.

The auxiliary data reference count may refer to the number of auxiliary data references that follow.

The auxiliary data reference may indicate the NDEF record that provides additional information on the alternative carrier.

The message structure has been so far described. Hereinafter, an example of information included in the message structure will be described according to the type of the alternative carrier.

Figure 16:
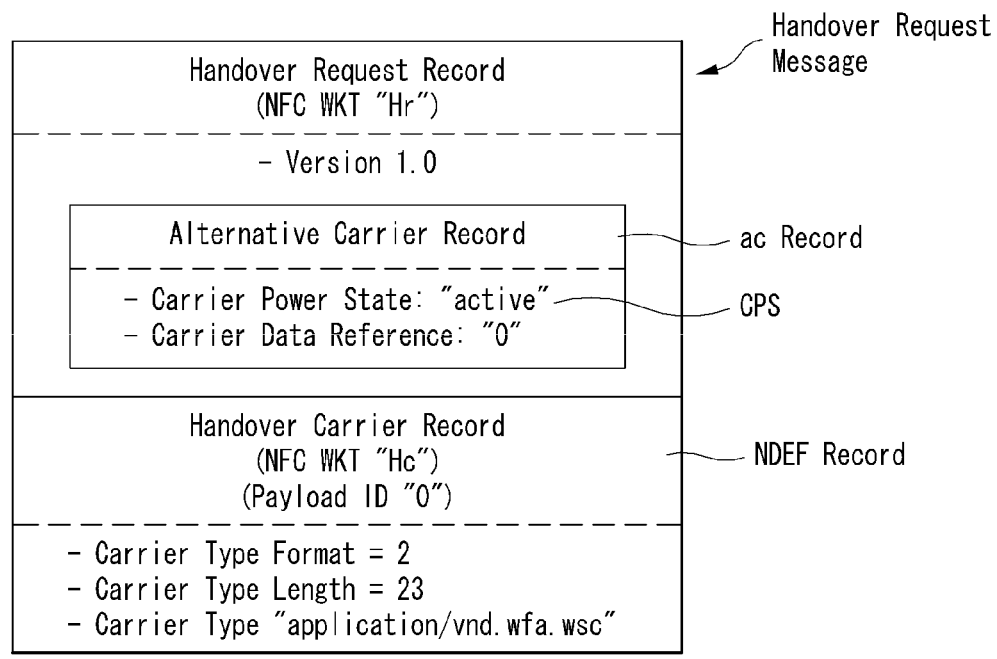
FIG. 16 illustrates an example of a handover request message when the alternative carrier is Wi-Fi according to an embodiment of the present invention.

FIG. 16 illustrates an example of a handover request message when the alternative carrier is Wi-Fi according to an embodiment of the present invention. As illustrated in FIG. 16, the handover request message may include the handover request record and the handover carrier record. That is, as described above, when the handover requester designates Wi-Fi as the alternative carrier, the NDEF record may have a format of the handover carrier that may include information for identifying Wi-Fi.

FIG. 17 illustrates a binary content of the Wi-Fi handover request message according to an embodiment of the present invention. That is, FIG. 17 illustrates another representation for the handover request message shown in FIG. 16.

Figure 18:
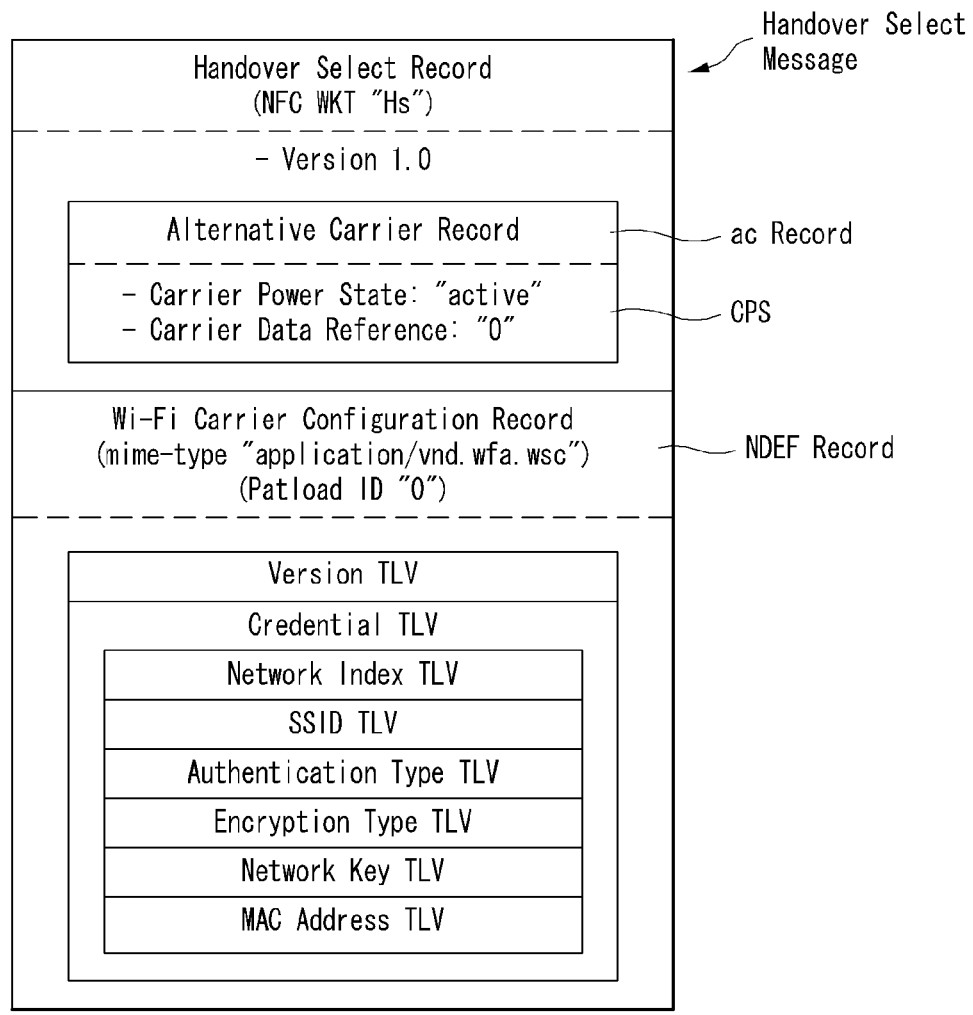
FIG. 18 illustrates a handover selection message when the alternative carrier is Wi-Fi according to an embodiment of the present invention.

FIG. 18 illustrates a handover selection message when the alternative carrier is Wi-Fi according to an embodiment of the present invention. As shown in FIG. 18, the handover selection message may include the handover selection record and the carrier environment setup record. That is, the carrier environment setup record is an example of the NDEF record described in connection with FIG. 9.

Referring to FIG. 18, the carrier environment setup record provided by the handover selector may include environment setup information necessary for the handover requester to access the alternative carrier provided by the handover selector, for example, information on service set identifier (SSID), authentication type TLV, encryption type TLV, network key, and MAC address TLV.

In other words, based on the information included in the handover carrier record received from the handover requester, the handover selector identifies that the alternative carrier supported by the handover requester is Wi-Fi, when the handover selector supports Wi-Fi, generates environment setup information necessary for the handover requester to form a Wi-Fi link with the handover selector, and transmits the generated environment setup information with the environment setup information included in the carrier environment setup record.

The handover requester may access the alternative carrier provided by the handover selector, for example, Wi-Fi, based on the carrier environment setup information received from the handover selector.

FIG. 19 illustrates a binary content of a handover selection message according to an embodiment of the present invention. That is, FIG. 19 shows another representation of the handover selection message illustrated in FIG. 18.

Although the embodiment described in connection with FIGS. 16 to 19 assumes that the alternative carrier is Wi-Fi, the embodiments may also apply to any type of alternative carriers in which the handover requester need not provide the alternative carrier environment setup information to the handover selector.

The handover request/selection messages that may be implemented when the alternative carrier is Wi-Fi have been described so far in connection with FIGS. 16 to 19. This may also apply to the embodiment described in connection with FIGS. 2 to 8.

Hereinafter, information including the handover request/selection messages when the alternative carrier is Bluetooth will be described with reference to the drawings.

Figure 20:
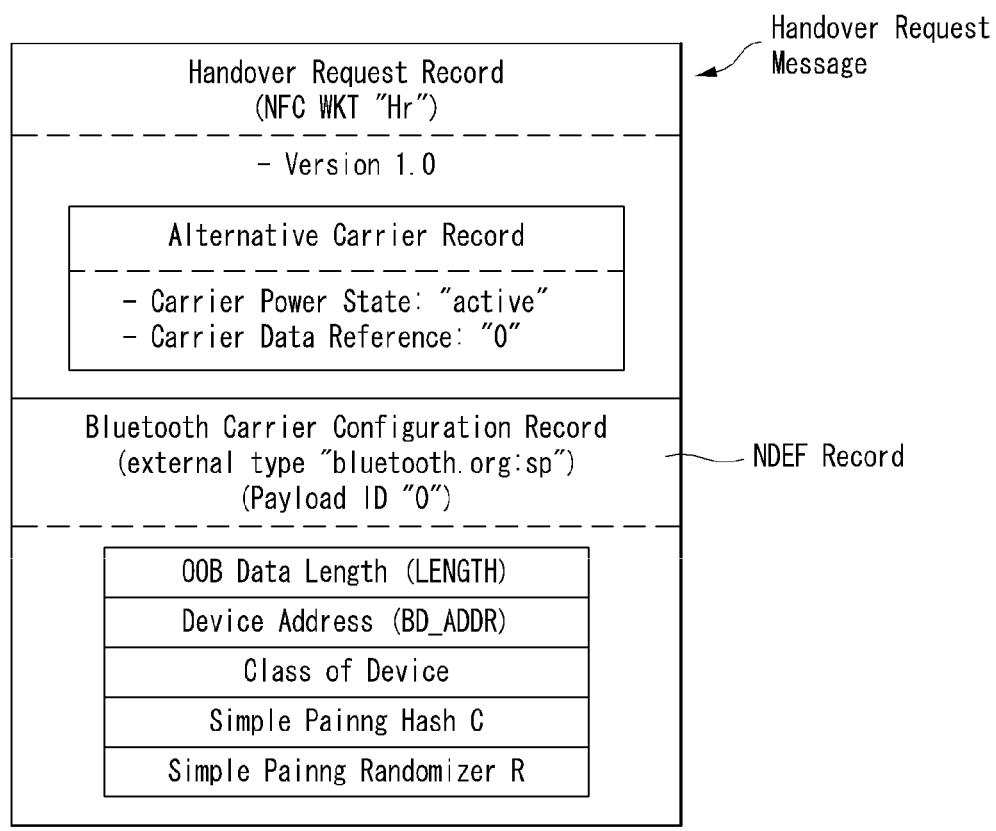
FIG. 20 illustrates an example of a handover request message when the alternative carrier is Bluetooth according to an embodiment of the present invention.

FIG. 20 illustrates an example of a handover request message when the alternative carrier is Bluetooth according to an embodiment of the present invention. Referring to FIG. 20, the handover request message may include the handover request record and the carrier environment setup record.

As shown in FIG. 20, the carrier environment setup record may include environment setup information necessary for the handover selector to access the alternative carrier provided by the handover requester, for example, Bluetooth. Meanwhile, even when the alternative communication means is Bluetooth, if there is no security means for Bluetooth, the carrier environment setup record of the handover request message may be replaced with the handover carrier record as described in connection with FIG. 16.

The information illustrated in FIG. 20 is apparent to those skilled in the art, and the detailed description is thus omitted.

FIG. 21 illustrates a binary content of a Bluetooth handover request message according to an embodiment of the present invention. That is, FIG. 21 shows another representation of the handover request message of FIG. 20.

Figure 22:
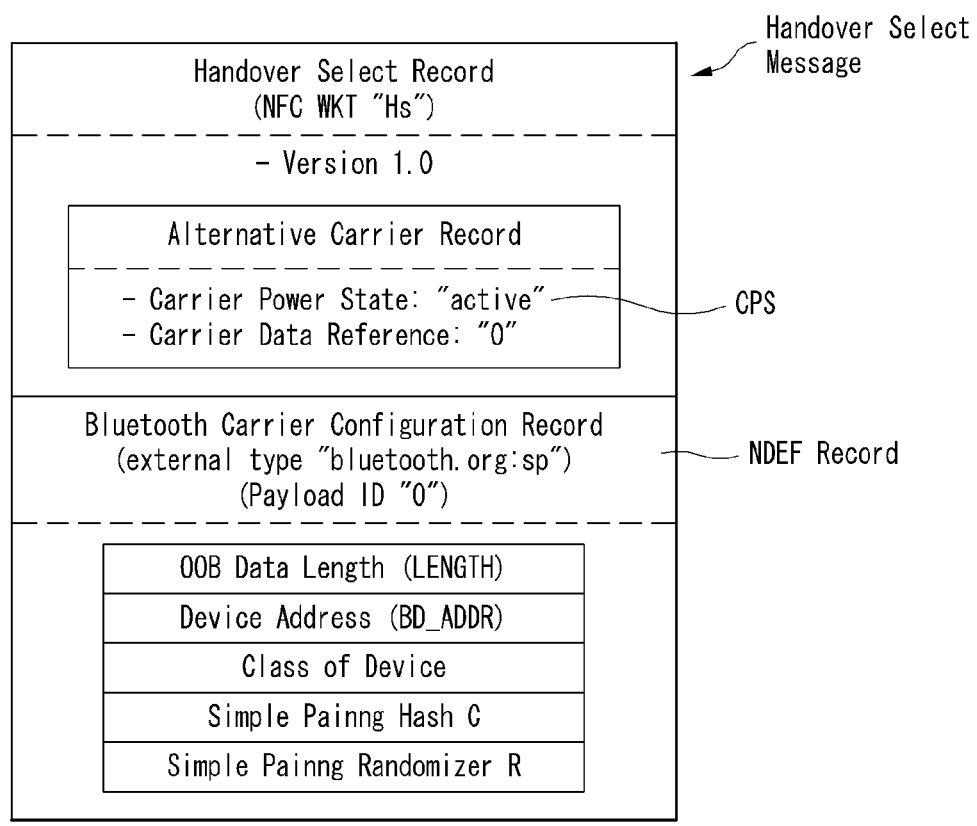
FIG. 22 illustrates an example of a handover selection message when the alternative carrier is Bluetooth according to an embodiment of the present invention.

FIG. 22 illustrates an example of a handover selection message when the alternative carrier is Bluetooth according to an embodiment of the present invention.

FIG. 22 illustrates an example of a handover selection message when the alternative carrier is Bluetooth according to an embodiment of the present invention. Referring to FIG. 22, the handover selection message may include the handover selection record and the carrier environment setup record.

As shown in FIG. 22, the carrier environment setup record may include environment setup information necessary for the handover requester to access the alternative carrier provided by the handover selector, for example, Bluetooth.

FIG. 23 illustrates a binary content of a Bluetooth handover request message according to an embodiment of the present invention. That is, FIG. 23 illustrates another representation of the handover selection message shown in FIG. 22.

Although the embodiments described in connection with FIGS. 20 to 23 assume that the alternative carrier is Bluetooth, the technical spirit of the invention is not limited to a specific carrier.

Further, although the embodiments described in connection with FIGS. 16 to 23 assume that one alternative carrier is provided, a plurality of alternative carriers may also be provided as illustrated in FIGS. 2 to 5. In such case, the handover request/selection messages shown in FIGS. 16 to 23 may each include information on a plurality of alternative carriers.

Hereinafter, a method of performing a handover will be described using the auxiliary data described in connection with FIG. 9.

Figure 24:
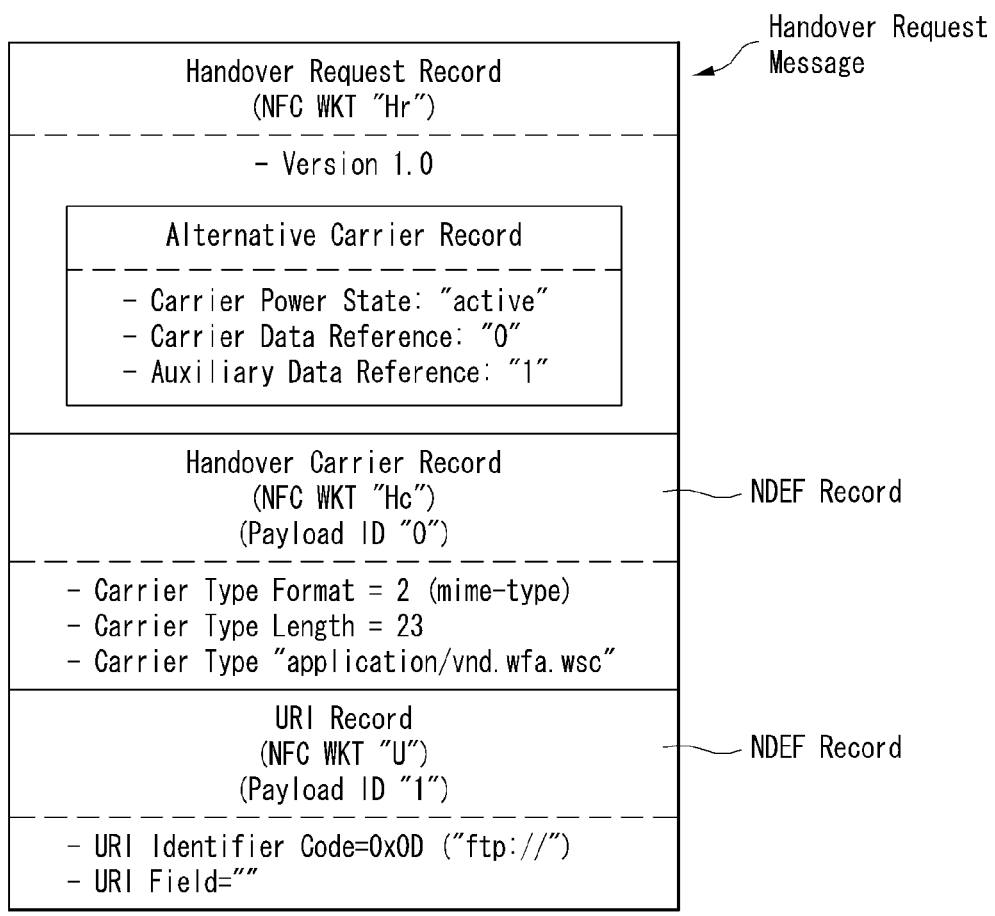
FIG. 24 illustrates an example of a handover request message using additional data according to a first embodiment of the present invention.

FIG. 24 illustrates an example of a handover request message using additional data according to a first embodiment of the present invention. The handover requester and the handover selector may open an FTP (File Transfer Protocol) session using the auxiliary data at the same time with handover. In this embodiment, the alternative carrier is assumed to be Wi-Fi.

Referring to FIG. 24, the handover request message may include a handover request record, a URI (Uniform Resource Identifier) record, and a handover carrier record which is an example of the NDEF record.

Referring to the handover request record illustrated in FIG. 24, the carrier data reference is 0, and the auxiliary data reference is 1. That is, the handover carrier record has payload ID 0, and the auxiliary data has payload ID 1. In other words, the URI record whose payload ID is 1 may belong to the auxiliary data.

The handover carrier record is the same as that described in connection with FIG. 16, and the detailed description is thus omitted.

The URI record which is the auxiliary data represents that the handover requester may perform the FTP. For example, the handover request message includes auxiliary data associated with the FTP so that it may be known to the handover selector that the handover requester supports the FTP.

Figure 25:
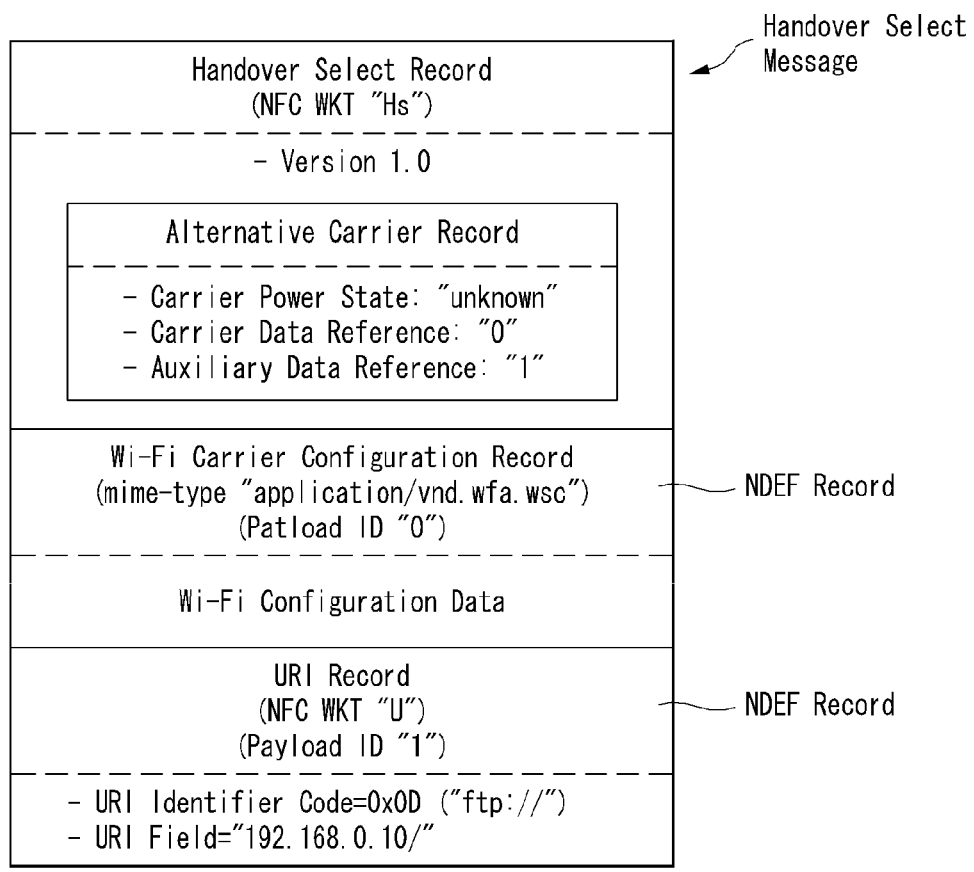
FIG. 25 is a view for describing an example of a handover selection message using additional data according to a first embodiment of the present invention.

FIG. 25 is a view for describing an example of a handover selection message using additional data according to a first embodiment of the present invention.

Referring to FIG. 25, the handover selection message may include a handover selection record, a URI record, and a Wi-Fi carrier environment setup record which is an example of the NDEF record.

Referring to FIG. 25, the URI record which is auxiliary data may include a URI field value for opening an FTP session.

By doing so, the handover requester may open the FTP session simultaneously with performing handover with the handover selector from the NFC link to Wi-Fi link.

Hereinafter, referring to FIGS. 26 and 27, there will be described a method of obtaining information on devices connected to the handover selector through an alternative carrier designated by the handover requester by the handover requester utilizing additional data together with handover.

Figure 26:
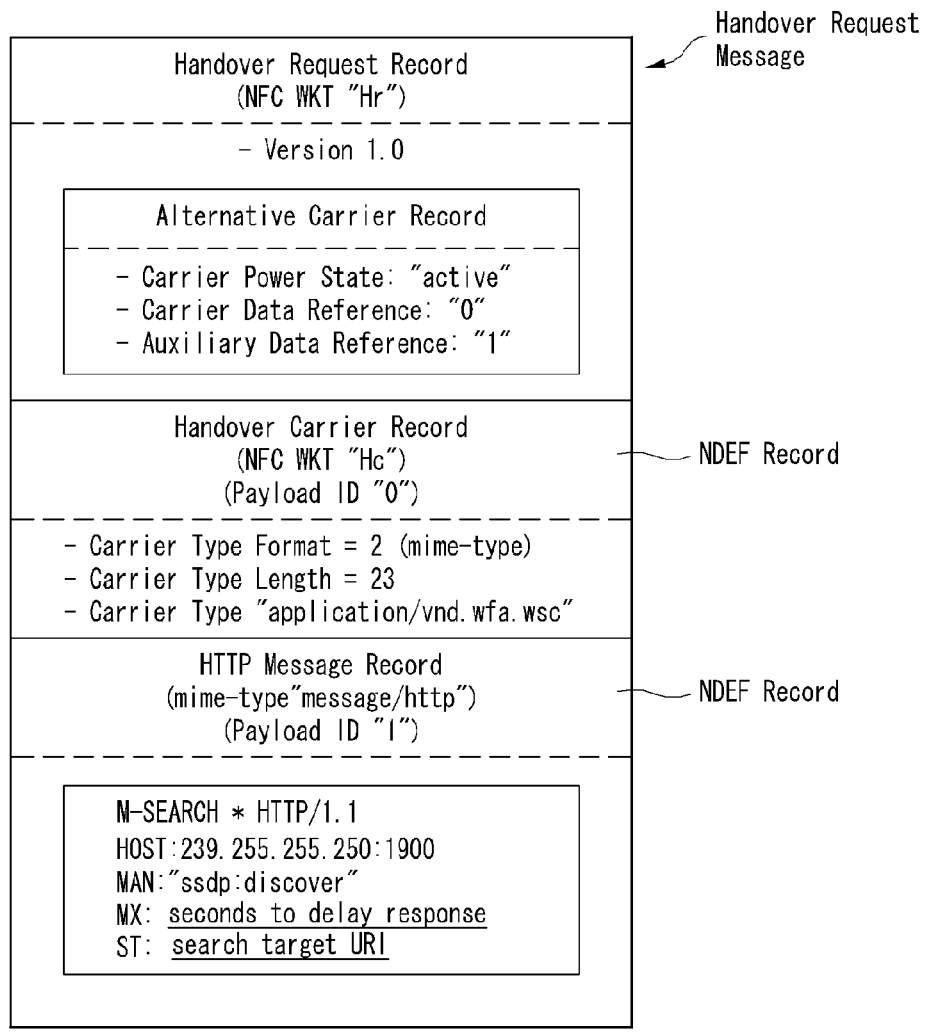
FIG. 26 illustrates a handover request message utilizing additional data according to a second embodiment of the present invention.

FIG. 26 illustrates a handover request message utilizing additional data according to a second embodiment of the present invention. In this embodiment, the alternative carrier is assumed to be Wi-Fi.

Referring to FIG. 26, the handover request message may include a handover request record, an HTTP message record, and a handover carrier record which is an example of the NDEF record.

The handover request message shown in FIG. 26 allows for recognition of a device linked through Wi-Fi to the handover selector while a request of handover to Wi-Fi is simultaneously made to the handover selector. For example, the device connected through Wi-Fi to the handover selector may include devices configuring a home network or an office network. For example, the home network or office network may be implemented by UPnP (Universal Plug & Play). The Wi-Fi network is merely an example, and any other networks constituted of other alternative carriers may be included.

The HTTP message record illustrated in FIG. 26 includes a message, e.g., M-search message, used for the devices in the UPnP network to recognize each other.

Further, the HTTP message record illustrated in FIG. 26 may include the type of a device to be searched by the handover requester. For example, the HTTP message record may include information on the type of a Wi-Fi connected device, for example, UPnP device. The type of the UPnP device may be designated by the ST (Search Target) illustrated in FIG. 26. The type of the UPnP device may include a variety of types, such as renderer, server, printer, or scanner. The ST field may designate the type of one or more UPnP devices to be searched, for example, a printer and a renderer, or may designate all types of the UPnP devices. When all types of UPnP devices are designated, the ST field may have a value of ssdp: all.

Hereinafter, the ST field of the HTTP message record is assumed to designate all types of UPnP devices, i.e., ssdp: all.

FIG. 27 illustrates additional data of a handover selection message utilizing additional data according to a second embodiment of the present invention.

FIG. 27 illustrates an example of additional data transmitted to the handover requester in response to the handover request message received by the handover selector.

Referring to FIG. 27, the additional data transmitted from the handover selector to the handover requester includes information on a Wi-Fi connected UPnP device which is an alternative carrier. For example, the information on the UPnP device may include a USN (Unique Service Name) for identifying the service name and a device identifier. The device identifier, as shown in FIG. 27, may be represented as UUID.

The handover requester performs handover to Wi-Fi while simultaneously obtaining information a Wi-Fi connected device, e.g., UPnP device, through the handover selector. By doing so, the handover selector may recognize the UPnP device which is part of the UPnP network in a more simplified manner.

Various handover protocols and the structure of the messages used for the handover protocols have been described above. Meanwhile, in the case that two electronic devices to perform handover have low mobility, the two electronic devices may have a difficulty in forming a communication link. For instance, when the first electronic device 100 is a DTV having an NFC communication module, and the second electronic device 200 is a computer having an NFC communication module, it is not easy to form an NFC communication link between the DTV and the computer due to their bulky volume and heavy weight. That is, it may be not easy to perform a handover protocol by forming an NFC link.

In such case, a connection may be established between the two low-mobility electronic devices via an electronic device with higher mobility. In the above example, when the first electronic device 100 is a DTV, and the second electronic device 200 is a computer, a third electronic device 300, e.g., a smartphone, may relay the handover protocol of the DTV and the computer. Specifically, the smartphone, the third electronic device 300, forms an NFC communication with the DTV, the first electronic device 100, to obtain information associated with the communication means from the DTV. The smartphone forms an NFC communication link with the computer, the third electronic device 300, and transmits the obtained information associated with the communication means of the DTV to the computer. Accordingly, the DTV and the computer may perform data communication through the communication means.

As such, it is referred to as "handover relay" that a higher-mobility electronic device relays a connection between electronic devices positioned at fixed locations so that a communication channel may be formed between the stationary electronic devices. The handover relaying is an arbitrary name and may be also called various other names, such as "connection information relaying" or "multi-tagging for a link". Such names are arbitrary and may be modified by those skilled in the art according to their preference. Hereinafter, for ease of description, it is referred to as "relay protocol".

Hereinafter, a relay protocol according to an embodiment of the present invention will be more specifically described with reference to the drawings.

Figure 28:
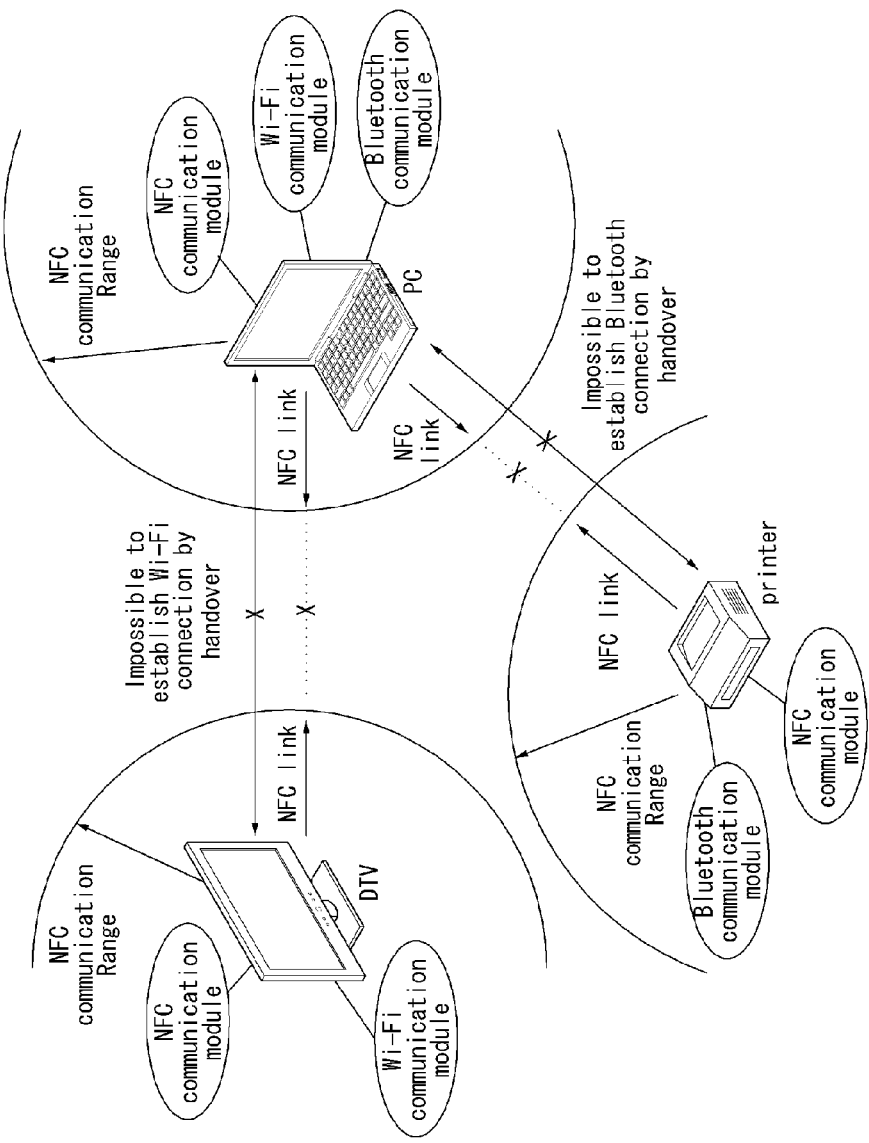
FIG. 28 is a view for describing an environment necessary for a relay protocol according to an embodiment of the present invention.

FIG. 28 is a view for describing an environment necessary for a relay protocol according to an embodiment of the present invention.

As shown in FIG. 28, it is assumed that the DTV supports NFC and Wi-Fi communication, the PC supports NFC, Wi-Fi, and Bluetooth communication, and the PRINTER supports NFC and Bluetooth communication.

Further, the DTV, PC, and PRINTER are assumed to be positioned outside an NFC communication range. In such case, it may be not easy for a user to execute a handover protocol between the DTV and the PC or between the PRINTER and the PC. That is, the user may suffer from relocating the DTV and the PC to be positioned within the NFC communication range. Accordingly, since an NFC link is not easy to form between the DTV and the PC, it is not easy to establish a Wi-Fi connection through the handover protocol. For the same reason, since an NFC link is not easy to form between the PRINTER and the PC, it is not easy to establish a Bluetooth connection through the handover protocol.

In such case, a relay protocol may be used that helps establishing a Wi-Fi connection between the DTV and the PC and a Bluetooth connection between the PRINTER and the PC.

Hereinafter, the above-introduced relay protocol may be described in greater detail.

Figure 29:
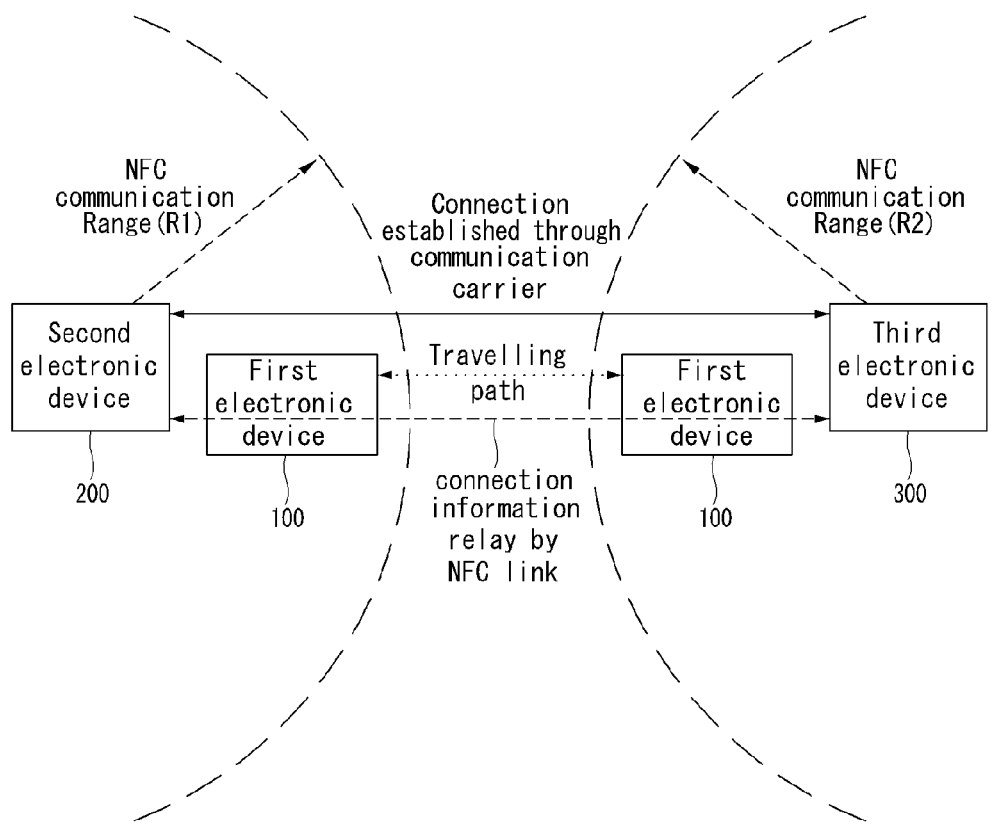
FIG. 29 schematically illustrates a connection handover relay according to an embodiment of the present invention.

FIG. 29 schematically illustrates a connection handover relay according to an embodiment of the present invention. Hereinafter, for efficient description, it is assumed in FIG. 29 that the first electronic device 100 is a smartphone, the second electronic device 200 is a DTV, and the third electronic device 300 is a PC.

As shown in FIG. 29, since the second electronic device 200 and the third electronic device 300 are positioned out of the NFC communication link, it may be not easy to form an NFC communication link between the second electronic device 200 and the third electronic device 300 and to perform the handover protocol therethrough.

The first electronic device 100 shown in FIG. 29 may be relocated within the NFC communication range, R1, of the second electronic device 200. By doing so, the first electronic device 100 may form an NFC communication link with the second electronic device 200. The first electronic device 100 may obtain information associated with the communication means supported by the second electronic device 200 from the second electronic device 200 through the NFC link.

For example, the user may input a first command signal through the input unit 140 of the first electronic device 100 to execute the relay protocol with the second electronic device 200. Further, according to the first command signal, if the first electronic device 100 obtains the information associated with the communication means supported by the second electronic device 200 from the second electronic device 200, the first electronic device 100 may notify the user that through the output unit 150 that the first electronic device 100 has obtained the information associated with the communication means of the second electronic device 200. This will be described later.

The first electronic device 100 may be relocated within the NFC communication range, R2, of the third electronic device 300. By doing so, the first electronic device 100 may form an NFC communication link with the third electronic device 300. Through the NFC communication link formed with the third electronic device 300, the first electronic device 100 may transmit the obtained information associated with the communication means of the second electronic device 200 to the third electronic device 300.

For example, the user may input a second command signal through the input unit 140 of the first electronic device 100 to execute the relay protocol with the third electronic device 300. Receiving the second command signal to execute the relay protocol, the first electronic device 100 may transfer to the third electronic device 300 the information associated with the communication means as obtained from the second electronic device 200. Further, the first electronic device 100 may output through the output unit 150 information to notify that the information associated with the communication means obtained from the second electronic device 200 has been transferred to the third electronic device 300. The second command signal may have various structures. This will be described later.

By doing so, the third electronic device 300 may obtain information for the communication means supported by the second electronic device 200. In other words, although not directly forming an NFC communication link with the second electronic device 200, the third electronic device 300 may obtain the information for the communication means of the second electronic device 200 through the first electronic device 100.

Further, the first electronic device 100 may transmit to the second electronic device 200 the information associated with the communication means supported by the third electronic device 300. Accordingly, the second electronic device 200 and the third electronic device 300 may establish a connection through the communication means supported by the third electronic device 300 and the second electronic device 200.

At this time, at least one of the second electronic device 200 and the third electronic device 300 may output information through their respective output units to notify that the connection has been established.

Hereinafter, the handover relay protocol generally described in connection with FIG. 29 will be described in greater detail with reference to the drawings.

Figure 30:
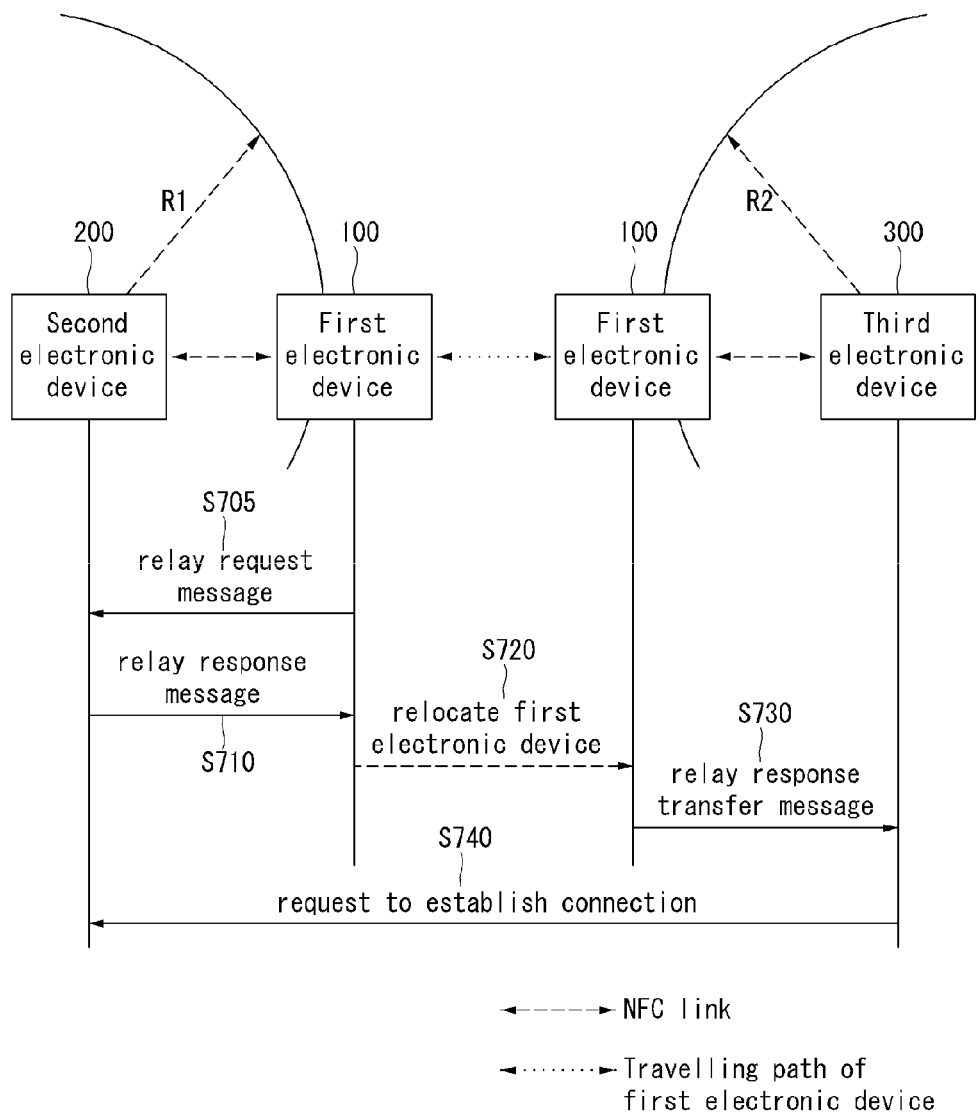
FIG. 30 is a view for describing a relay protocol according to a first embodiment of the present invention.

FIG. 30 is a view for describing a relay protocol according to a first embodiment of the present invention. FIGS. 31(a), 31(b), 31(c), 31(d), 31(e), 31(f), 31(g), and 31(h) are views for describing a guide message used for a relay protocol according to the present invention. Referring to FIGS. 30 and 31, a method of establishing a connection between the second electronic device 200 and the third electronic device 300 shown in FIG. 30 will be described.

Referring to FIG. 30, the first electronic device 100 may transmit a relay request message to the second electronic device 200 (S705).

For this, the first electronic device 100 may enter into the NFC communication range R1 of the second electronic device 200. When entering into the NFC communication range R1 of the second electronic device 200, the first electronic device 100 may form an NFC link with the second electronic device 200.

For instance, as shown in FIG. 31(a), the first electronic device 100 may output through the output unit 150 a guide message to notify that the NFC link has been formed between the first electronic device 100 and the second electronic device 200. The guide message may be output in various ways, such as popup, widget, or icon. The second electronic device 200 may also output a guide message to notify establishment of the NFC link with the first electronic device 100.

Further, for example, through the NFC link formed with the second electronic device 200, the first electronic device 100 may output various options as may be provided. For example, as shown in FIG. 31(b), the first electronic device 100 may output various protocols that may be performed through the NFC link.

The user may select his desired option through a user interface output as shown in FIG. 31(b). For example, by touching the relay protocol with his finger fl, the user may instruct the first electronic device 100 to perform the relay protocol. Here, before selecting the handover protocol shown in FIG. 31(b), the above-described handover protocol may be executed.

On the other hand, the second electronic device 200 may output the user interface shown in FIG. 31(b).

Hereinafter, although the description continues focusing on the first electronic device 100, this is merely for ease of description, and the second electronic device 200 may also provide the same user interaction as that provided by the first electronic device 100.

Receiving the user's relay request, the first electronic device 100 may transmit a relay request message to the second electronic device 200 to request information associated with the communication means supported by the second electronic device 200. The relay request message is an arbitrary name and may be called in various other ways.

On the other hand, the user may designate his desired communication means through the user interface. Here, the user's desired communication means may refer to a communication means to be used for forming a connection between the second electronic device 200 and the third electronic device 300.

As shown in FIG. 31(c), the user may designate Wi-Fi as the communication means to be used for connection between the second electronic device 200 and the third electronic device 300 by touching Wi-Fi through the user interface output by the first electronic device 100.

The relay request message may include information indicating what communication means the user has designated. Through this, the second electronic device 200 may determine what communication means the user wants by receiving the relay request message.

Receiving the relay request message from the first electronic device 100, the second electronic device 200 may transmit a relay response message to the first electronic device 100 in response to the relay request message (S710).

For this, receiving the relay request message, the second electronic device 200 may generate a relay response message. The relay response message may include information associated with the communication means supported by the second electronic device 200, i.e., the communication means to be used for formation of a connection between the second electronic device 200 and the third electronic device 300. The communication means-associated information may include at least one of information to identify what the communication means is and the environment setup information necessary for establishing a connection through the communication means.

Referring to FIG. 30, the second electronic device 200 may support Wi-Fi as the communication means. Accordingly, the second electronic device 200 may generate the relay response message including the Wi-Fi-related information.

For example, the communication means-associated information provided from the second electronic device 200 to the first electronic device 100 may include information notifying that the communication means supported by the second electronic device 200 is Wi-Fi. For example, the communication means-associated information may include environment setup information necessary for establishment of a Wi-Fi link between the second electronic device 200 and the third electronic device 300.

Further, for example, when the second electronic device 200 accesses a separate Wi-Fi AP (Access Point), the communication means-associated information supported by the second electronic device 200 may include environment setup information necessary for accessing the Wi-Fi AP.

Meanwhile, when the second electronic device 200 supports one or more communication means, the communication means-associated information supported by the second electronic device 200 may include one or more units.

Further, for example, the second electronic device 200 may generate information associated with all the communication means supported by the second electronic device 200.

That is, when the second electronic device 200 supports a plurality of communication means, the second electronic device 200 may generate information associated with each of the communication means.

On the other hand, as described earlier, when the user designates a specific communication means, the second electronic device 200 may determine whether the second electronic device 200 supports the user's designated communication means. When the user's designated communication means is not supported by the second electronic device 200, the second electronic device 200 may output a guide message notifying that the user's designated communication means is not supported by the second electronic device 200. At this time, the second electronic device 200 may output through the output unit information notifying what communication means is supported by the second electronic device 200.

Further, by the second electronic device 200 transmitting to the first electronic device 100 information notifying that the second electronic device 200 does not support the user's designated communication means, as shown in FIG. 31(d), the first electronic device 100 may output to the user a guide message notifying that the second electronic device 200 does not support the user's designated communication means. Further, as shown in FIG. 31(d), in the same way, the first electronic device 100 may output information notifying what communication means is supported by the second electronic device 200.

Further, for example, when determining that the second electronic device 200 supports the user's designated communication means, the second electronic device 200 may transmit to the first electronic device 100 a relay response message including information associated with the user's designated communication means.

That is, in response to the received relay request message, the second electronic device 200 may transmit to the first electronic device 100 information associated with the generated communication means supported by the second electronic device 200.

Hereinafter, for convenience of description, the relay response message is assumed to include information indicating what communication means is supported by the second electronic device 200 and the environment setup information.

When the reception of the relay response message from the second electronic device 200 is complete, the first electronic device 100 may output through the output unit 150 of the first electronic device 100 information notifying that the communication means associated with the second electronic device 200 has been received from the second electronic device 200. Further, the first electronic device 100 may output a guide message stating that the information associated with the communication means supported by the second electronic device 200 and thus it is relocated toward another electronic device to execute relay. FIG. 31(e) illustrates an example of the guide message that may be used. As described earlier, the second electronic device 200 may also output the same information as the information output by the first electronic device 100.

The first electronic device 100 receives the relay response message from the second electronic device 200 and may travel toward the third electronic device 300 (S720).

In other words, the user may be relocated within the NFC communication range R2 of the third electronic device 300 which is the other electronic device to establish a connection with the second electronic device 200. The first electronic device 100, by entering into the NFC communication range of the third electronic device 300, may establish an NFC connection with the third electronic device 300.

As described earlier, the output unit 150 of the first electronic device 100 may output information notifying that an NFC link has been formed between the first electronic device 100 and the third electronic device 300.

Further, the first electronic device 100 may provide a user interface inquiring whether the relay protocol is to be executed together with the third electronic device 300. Unlike this, without providing the user interface inquiring whether the relay protocol is to be executed with the third electronic device 300, the first electronic device 100 may automatically execute the relay protocol with the third electronic device 300. That is, upon execution of the relay protocol, the first electronic device 100 may automatically recognize the NFC device recognized right after it as the device to execute the relay protocol.

Hereinafter, the first electronic device 100 is assumed to receive execution of the relay protocol with the third electronic device 300 from the user.

The first electronic device 100 may relay the relay response message to the third electronic device 300 through the NFC link formed with the third electronic device 300 (S730).

In other words, the first electronic device 100 may transfer the relay response message received from the second electronic device 200 to the third electronic device 300 by various methods. As used herein, the first electronic device 100 transmitting the relay response message received from the second electronic device 200 to the third electronic device 300 is referred to as a relay response transfer message. This is an arbitrary name and may be also called in different ways.

For example, the first electronic device 100 may transfer the relay response message received from the second electronic device 200 to the third electronic device 300.

In contrast, when receiving the relay request message from the third electronic device 300, the first electronic device 100 may transfer the relay response message received from the second electronic device 200 to the third electronic device 300.

Further, the first electronic device 100 may transfer, as is, to the third electronic device 300 the relay response message received from the second electronic device 200, or may process the relay response message received from the second electronic device 200 and then transfer the processed result to the third electronic device 300.

The third electronic device 300 may determine what communication means is supported by the second electronic device 200 by receiving the information associated with the communication means supported by the second electronic device 200, i.e., the relay response transfer message, from the first electronic device 100.

When the communication means supported by the second electronic device 200 is not supported by the third electronic device 300, the third electronic device 300 may output through the output unit a guide message notifying that there is no matching means. At this time, the third electronic device 300 transmits the guide message notifying that there is no matching communication means to the first electronic device 100, and the first electronic device 100 may also output a guide message notifying that there is no matching communication means as shown in FIG. 31(*f*).

On the other hand, when the second electronic device 200 supports plural communication means, the third electronic device 300 may determine what communication means may be supported by the third electronic device 300 among the plural communication means supported by the second electronic device 200.

For example, the third electronic device 300 may perform step S740 when the third electronic device 300 supports a specific communication means among the plural communication means supported by the second electronic device 200.

Meanwhile, for example, when the third electronic device 300 supports multiple communication means among the plural communication means supported by the second electronic device 200, the following procedures may be performed.

For example, the third electronic device 300 may form a connection with the second electronic device 200 through plural communication means supported by the third electronic device 300. That is, the third electronic device 300 may attempt to make a connection with the second electronic device 200 through the plural communication means.

Unlike this, the third electronic device 300 may select a particular communication means among the plural communication means supported by the third electronic device 300. For example, the third electronic device 300 may output a user interface through the output unit to allow a particular communication means to be designated. That is, the third electronic device 300 may try to make a connection with the second electronic device 200 through the communication means designated by the user.

On the contrary, the third electronic device 300 may establish communication with the second electronic device 200 through a communication means having a higher priority among the plural communication means.

Like the handover protocol described earlier, a communication means coming earlier in the information associated with the plurality of communication means may have a higher priority.

For example, among the plural communication means included in the relay response message of the second electronic device 200, a communication recorded earlier may have a higher priority than a communication recorded later.

Further, unlike this, a separate field may be provided to designate the priority and this field may indicate priorities of the plural communication means, respectively.

Hereinafter, the third electronic device 300 is assumed to support Wi-Fi communication which is also supported by the second electronic device 200.

The third electronic device 300 may send a request of establishment of a Wi-Fi connection to the second electronic device 200 (S740).

For example, the third electronic device 300 may send a request to the second electronic device 200 to establish the Wi-Fi connection.

For this purpose, upon receiving environment setup information necessary for Wi-Fi connection from the second electronic device 200, the third electronic device 300 may establish the Wi-Fi connection with the second electronic device 200 based on the received environment setup information necessary for establishment of the Wi-Fi connection.

For example, when the second electronic device 200 provides a Wi-Fi AP function, the third electronic device 300 may send a request for establishment of a Wi-Fi connection to the second electronic device 200 based on the received Wi-Fi environment setup information.

On the other hand, when the second electronic device 200 is not the Wi-Fi AP, the third electronic device 300 may establish the Wi-Fi connection with the second electronic device 200 by sending a request for Wi-Fi connection to the Wi-Fi AP based on the Wi-Fi environment setup information received from the second electronic device 200.

When the connection is successfully formed through the communication means with the second electronic device 200, the third electronic device 300 may output a guide message through the output unit to notify that the relay protocol has been successfully done. Of course, at least one of the first electronic device 100 and the second electronic device 200 may also output a guide message notifying that the connection has been successfully established between the second electronic device 200 and the third electronic device 300. As shown in FIG. 31(*g*), the first electronic device 100 may output through the output unit 150 information notifying that the Wi-Fi connection has been successfully established between the second electronic device 200 and the third electronic device 300.

The second electronic device 200 and the third electronic device 300 may exchange data through the generated communication channel.

Accordingly, the second electronic device 200 and the third electronic device 300 may form a connection more conveniently through the NFC communication means.

Through the above-described procedures, even though the second electronic device 200 and the third electronic device 300 are not on the move, the first electronic device 100 may relay information necessary for forming a connection between the second electronic device 200 and the third electronic device 300 so that the connection may be established between the second electronic device 200 and the third electronic device 300.

Hereinafter, relay will be described according to another embodiment of the present invention.

Figure 32:
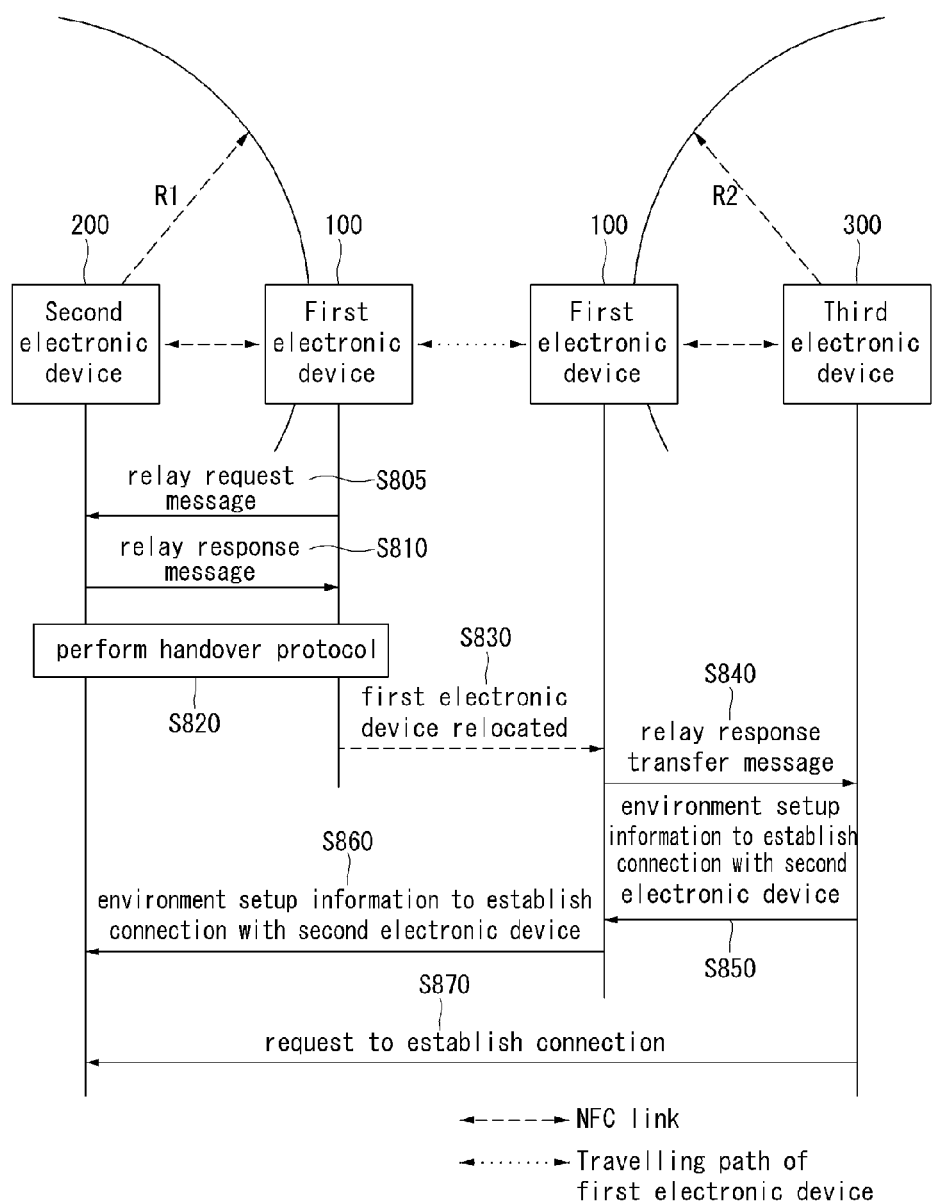
FIG. 32 is a view for describing relay according to a second embodiment of the present invention.

FIG. 32 is a view for describing relay according to a second embodiment of the present invention. The detailed description on the same part as the relay protocol described according to the first embodiment in connection with FIG. 30 will be omitted. The difference from the relay protocol described in connection with FIG. 30 according to the first embodiment is that the second electronic device 200 needs to receive separate information from the third electronic device 300 to establish a connection between the second electronic device 200 and the third electronic device 300 so that the second electronic device 200 establishes a connection with the communication means of the third electronic device 300. For example, to form a connection with the third electronic device 300, the second electronic device 200 may need to receive environment setup information, e.g., encrypted Mac address, of the third electronic device 300.

Also in describing the relay protocol according to the second embodiment, the second electronic device 200 is assumed to support Wi-Fi.

Steps S805 and S810 of FIG. 32 are the same as step S705 and S710 of FIG. 30, and thus the detailed description will be omitted.

The first electronic device 100 may receive the relay response message and may execute the handover protocol described in connection with FIGS. 1 to 27 earlier than the second electronic device 200 does.

In other words, the first electronic device 100 and the second electronic device 200 may respectively perform the handover protocol from the point of view of the handover selector/requester or the handover requester/selector. For example, the first electronic device 100 and the second electronic device 200 may form a Wi-Fi connection by performing the handover protocol. By doing so, the first electronic device 100 may happen to communicate with the second electronic device 200 even out of the NFC communication range R1 of the second electronic device 200.

Turning back to FIG. 32, step S830 of FIG. 32 is the same as step S720 of FIG. 30, and thus, the detailed description will be omitted.

The first electronic device 100 may transfer the relay response message to the third electronic device 300 (S840). Also, the first electronic device 100 may send a request for information on the communication means supported by the third electronic device 300 to the third electronic device 300. For this, the first electronic device 100 may transmit a separate command to the third electronic device 300. For example, the first electronic device 100 may transmit a handover request message to the third electronic device 300. Also, as another example, instruction information requesting information on the communication means supported by the third electronic device 300 may be included in the relay response transfer message and may be transferred to the third electronic device 300.

The third electronic device 300 may identify what communication means is supported by the second electronic device 200 by receiving the information indicating the communication means supported by the second electronic device 200, i.e., the relay response transfer message, from the first electronic device 100.

That is, the third electronic device 300 may identify that the communication means supported by the second electronic device 200 is Wi-Fi.

The third electronic device 300 may transmit to the first electronic device 100 environment setup information for forming a Wi-Fi connection between the second electronic device 200 and the third electronic device 300 (S850).

The first electronic device 100 may transmit the environment setup information received from the third electronic device 300 to the second electronic device 200. At this time, the first electronic device 100 may transmit to the second electronic device 200 the information received from the third electronic device 300 in step S850 through the Wi-Fi link formed with the second electronic device 200 by the handover process in step S820.

The second electronic device 200 may send a request of connection establishment to the third electronic device 300 (S870). In other words, the second electronic device 200 may send the connection establishment request to the third electronic device 300 based on the environment setup information of the third electronic device 300 received from the first electronic device 100. More specifically, the second electronic device 200 may send a request of Wi-Fi connection establishment to the third electronic device 300 based on the environment setup information necessary to establish the Wi-Fi connection with the third electronic device 300.

Accordingly, according to the embodiment described in connection with FIG. 32, a connection may be formed between the second electronic device 200 and the third electronic device 300.

The embodiment described in connection with FIG. 32 is not limited to application of Wi-Fi and may apply to any situation where the second electronic device 200 needs to receive information from the third electronic device 300 to form a connection between the second electronic device 200 and the third electronic device 300. For example, when the second electronic device 200 needs to transmit a password to the third electronic device 300 to form a connection between the second electronic device 200 and the third electronic device 300, the third electronic device 300 transmits to the first electronic device 100 information associated with the password, and the first electronic device 100 relays the received password-associated information to the second electronic device 200 so that the second electronic device 200 may send a request of establishment of a connection to the third electronic device 300.

Hereinafter, referring to FIGS. 30 and 32, the structure of data used for the above-described relay protocol will be described as an example.

FIG. 33 illustrates an example of a relay request message according to an embodiment of the present invention.

As described earlier, the relay request message may be used for the first electronic device 100, a relay device, to request communication means-associated information of the second electronic device 200.

The relay request message may have various data structures. For example, the relay request message may have the same data structure as the handover request message used for the above-described handover protocol.

As another example, as illustrated in case 1 of FIG. 30, the relay request message may include a handover request message and one or more handover carrier records.

The handover request message included in the relay request message may be identical to the handover request message used for the handover protocol. That is, the relay request message may provide the effect of being able to reduce the number of processes necessary to define a new record by using, as is, the handover request record used for the handover protocol.

Further, the handover carrier record included in the relay request message may include information on the type of the communication means whose request is sent from the first electronic device 100 to the second electronic device 200.

In other words, the first electronic device 100 may record information to identify the communication means, such as Wi-Fi or Bluetooth, in the handover carrier record. Through this, the second electronic device 200 may identify what communication means is desired by the first electronic device 100.

As described earlier, when the user input to the first electronic device 100 a communication means to be used for formation of a communication link between the second electronic device 200 and the third electronic device 300, the handover carrier record may include the information for identifying the communication means designated by the user.

Further, case 2a of FIG. 33 illustrates another example of the relay request message.

Referring to the relay request message shown in case 2a of FIG. 33, the relay request message may include a handover request record and a handover carrier record.

At this time, the handover carrier record may include instruction information requesting information associated with all the communication means supported by the electronic device receiving the relay request message. At this time, the message structure may be simplified by using, as is, the above-described handover protocol for the relay protocol. Further, the new carrier type may need to be defined in NFC RTD (Record Type Definitions), RFC2046, and RFC3986 defined in NFC standards to be included in the handover carrier record.

Further, in contrast, as shown in case 2b of FIG. 33, the relay request message may include a handover request record and a relay record. That is, the relay request message may include a separate relay protocol for the relay protocol.

At this time, the data structure for the relay record may need to be defined in the NFC well known type.

In describing cases 2a and 2b of FIG. 33, it has been assumed that the instruction information requesting the information associated with all the communication means is recorded in the handover carrier record of case 2a or the relay record of case 2b. However, unlike this, the instruction information may be also recorded in other records. For example, the record may be recorded in the handover request record.

Returning to FIG. 33, FIG. 33 illustrates an example of the relay response message.

The relay response message refers to a message used for the electronic device receiving the relay request message to provide a response to the received relay request message to the relaying device.

For example, when receiving a relay request message from the first electronic device 100, the second electronic device 200 may transmit a relay response message to the first electronic device 100 in response to the received relay request message.

The relay response message shown in FIG. 33 may include a handover selection message and one or more NDEF messages. At this time, the data structure used for the relay protocol may be made to be the same as the data structure used for the handover protocol.

The one or more NDEF records included in the relay response message may include various types of information necessary for forming a link with the third electronic device 300 through alternative communication supported by the second electronic device 200.

Referring back to FIG. 33, FIG. 33 illustrates an example of the relay response transfer message.

The relay response transfer message may refer to a message for the relaying device to transfer the received relay response message to the electronic device to establish a link.

For example, the first electronic device 100 may transfer the relay response message received from the second electronic device 200 to the third electronic device 300 through the relay response transfer message.

As shown in FIG. 33, the relay response transfer message may include a relay transfer record and one or more NDEF records.

The relay transfer record may include information for identifying that the message is to transfer the relay response.

Further, the one or more NDEF messages may be the same as one or more NDEF records included in the relay response message.

In other words, receiving the relay response message from the second electronic device 200, the first electronic device 100 may extract the one or more NDEF records included in the relay response message and include the extracted one or more NDEF records in the relay response transfer message, thereby generating the relay response transfer message.

Further, unlike this, the relay response transfer message may include the same data structure as the relay response message. In such case, separate information may be transmitted so that it is known that the electronic device receiving the relay response transfer message is in execution of the relay protocol. For example, the first electronic device 100 may transfer the relay response message to the third electronic device 300 together with information notifying that the relay response message is transferred according to the relay protocol. Further, for example, the first electronic device 100 may transmit to the third electronic device 300 information notifying that the relay protocol is in execution with the second electronic device 200.

By notifying the third electronic device 300 that the relay protocol is being executed, the first electronic device 100 may not create errors although the third electronic device 300 receives, as the relay response message, the above-described handover selection message.

The data structure used for the relay protocol has been described above. Hereinafter, another embodiment of the relay protocol will be described with response to the drawings.

Figure 34:
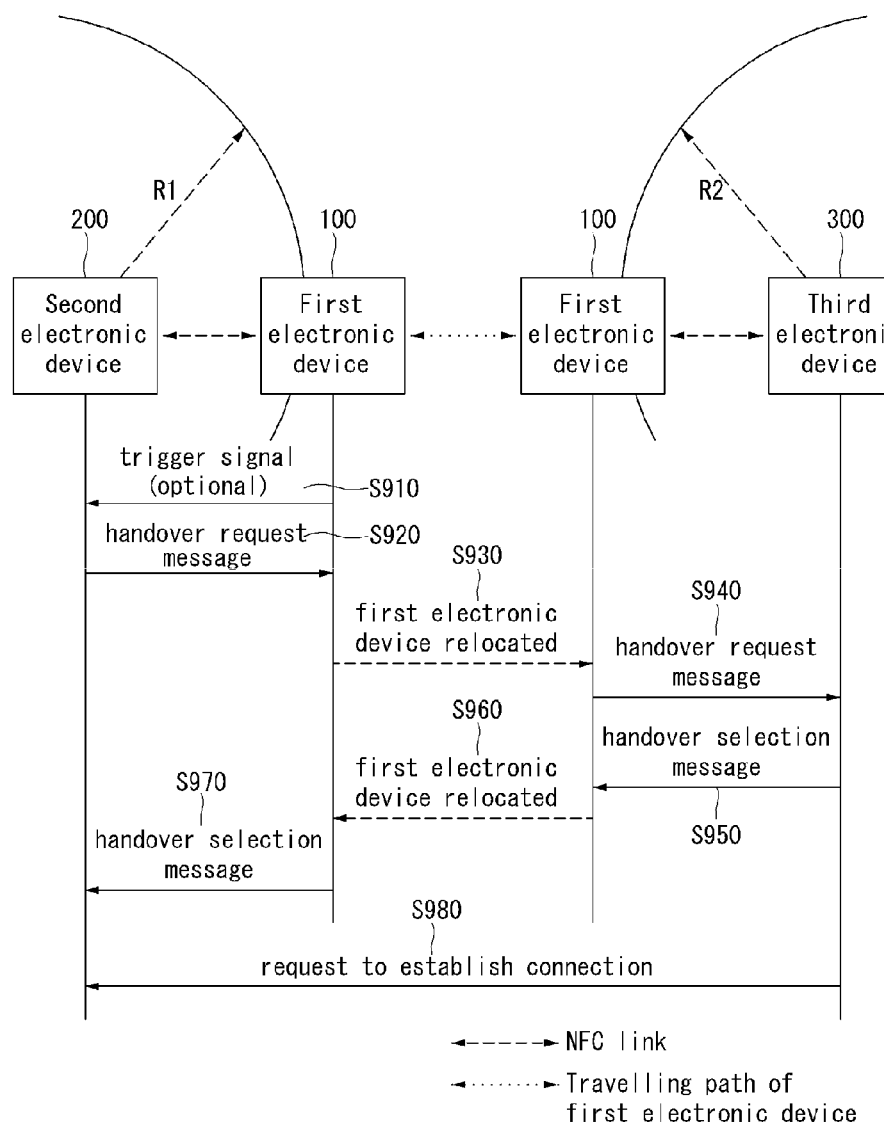
FIG. 34 is a view for describing a relay protocol according to a third embodiment of the present invention.

FIG. 34 is a view for describing a relay protocol according to a third embodiment of the present invention.

While describing the relay protocol in connection with FIG. 34, what is the same as the embodiment described in connection with FIGS. 30 and 32 will be omitted.

The first electronic device 100 may transmit a trigger signal to the second electronic device 200 (S910).

By entering into the NFC communication range R1 of the second electronic device 200, the first electronic device 100 may form an NFC communication link with the second electronic device 200.

The first electronic device 100 may transmit the relay protocol trigger signal to the second electronic device 200 through the formed NFC communication link. In other words, upon receiving an instruction of initiating the relay protocol from the user through the user interface as shown in FIG. 31(b), the first electronic device 100 may transmit to the second electronic device 200 the trigger signal notifying initiating the relay protocol.

The trigger signal may include information notifying that the relay protocol is initiated. That is, receiving the trigger signal, the second electronic device 200 may recognize the initiation of the relay protocol through the trigger signal.

Receiving the trigger signal, the second electronic device 200 may transmit the handover request message to the first electronic device 100 (S920). That is, unlike what has been described in connection with FIGS. 31 and 32, the present embodiment may use, as is, the message used for the handover protocol.

More specifically, when receiving the trigger signal, the second electronic device 200 may generate the handover request message including information on the communication means supported by the second electronic device 200.

Receiving the handover request message from the second electronic device 200, the first electronic device 100 may be relocated within the NFC communication range R2 of the third electronic device 300 (S930).

Also in this situation, when completely receiving the handover request message from the second electronic device 200, the first electronic device 100, as shown in FIG. 31(e), may also output a guide message instructing the move toward another electronic device to execute the relay protocol.

When being relocated within the NFC communication range R2 of the third electronic device 300, the first electronic device 100 may form an NFC link with the third electronic device 300.

The first electronic device 100 may transmit to the third electronic device 300 the handover request message received from the second electronic device 200 through the NFC link formed with the third electronic device 300 (S940).

Receiving the handover request message, the third electronic device 300 may transmit the handover selection message to the first electronic device 100 through the NFC link in response to the handover request message (S950).

Regarding the handover request message received by the third electronic device 300, the procedure of generating the handover selection message may be the same as the handover protocol procedure described in connection to FIGS. 1 to 27.

Receiving the handover selection message from the third electronic device 300, the first electronic device 100 may be again relocated within the NFC communication range R1 of the first electronic device 100 (S960).

Upon receiving the handover selection message from the third electronic device 300, the first electronic device 100 may output a guide message notifying that the reception of the handover selection message has been complete as shown in FIG. 31(g). Unlike this, when completely receiving the handover selection message from the third electronic device 300, the first electronic device 100 may output a guide message instructing the move toward the second electronic device 200. The first electronic device 100 may output both the guide messages as well.

Entering into the NFC communication range R1 of the second electronic device 200, the first electronic device 100 may form an NFC communication link with the second electronic device 200.

The first electronic device 100 may transmit the received handover selection message to the first electronic device 100 through the NFC communication link (S970).

The handover selection message from the third electronic device 300 is relayed to the second electronic device 200 via the first electronic device 100, so that the second electronic device 200 may obtain information on the communication means supported by the third electronic device 300. This may be implemented by the same way as the handover protocol described in connection with FIGS. 1 to 27.

The second electronic device 200 may transmit a connection establishment request message to the third electronic device 300 based on the received handover selection message (S980).

Accordingly, the second electronic device 200 and the third electronic device 300 may establish a connection.

Further, at least one of the first electronic device 100, the second electronic device 200, and the third electronic device 300 may output through the output unit guide information notifying that the second electronic device 200 and the third electronic device 300 have successfully formed a connection as shown in FIG. 31(g).

Still further, it is needed to previously set a time interval between when the second electronic device 200 transmits the handover request message to the first electronic device 100 and when the second electronic device 200 receives from the first electronic device 100 the handover selection message of the third electronic device 300.

The time interval may be set by the user or as a predetermined value.

Unless the second electronic device 200 receives the handover selection message of the third electronic device 300 within the time interval, the second electronic device 200 may generate an error message.

For example, when failing to receive the handover selection message of the third electronic device 300 during the time interval, the second electronic device 200 may output an error message (not shown) through the output unit of the second electronic device 200.

According to the embodiment of the relay protocol described in connection with FIG. 34, the relay protocol may be performed based on the above-described handover protocol.

Still another embodiment of the relay protocol will be described with reference to the accompanying drawings.

FIG. 35 is a view for describing a relay protocol according to a fourth embodiment of the present invention. FIGS. 36(a) and 36(b) illustrate a guide message used for the relay protocol according to the present invention.

The fourth embodiment of the relay protocol is a variation of the third embodiment described in connection with FIG. 34, and thus, the same portion as the third embodiment is not repeatedly described.

Steps S1010 and S1020 of FIG. 35 are the same as steps S910 and S920 of FIG. 33 and thus the detailed description is not repeated.

The first electronic device 100 may perform the handover protocol with the second electronic device 200 (S1030).

That is, receiving the handover request message from the second electronic device 200, the first electronic device 100 stands as a handover selector, and the second electronic device 200 may perform the handover protocol as a handover requester. A specific embodiment of the handover protocol is the same as what has been described above and thus the detailed description is omitted.

Through this, the first electronic device 100 and the second electronic device 200 may form a link through an alternative communication means. In this embodiment, the first electronic device 100 and the second electronic device 200 are assumed to form a Wi-Fi link.

At least one of the first electronic device 100 and the second electronic device 200 may output a guide message in association with success of the handover protocol.

For example, at least one of the first electronic device 100 and the second electronic device 200 may output through the output unit a guide message notifying that the first electronic device 100 and the second electronic device 200 have successfully performed the handover from the NFC link to the alternative communication link as shown in FIG. 36(a).

For example, at least one of the first electronic device 100 and the second electronic device 200 may output a guide message instructing the move toward another electronic device to execute the relay protocol as shown in FIG. 31(e).

At least one of the first electronic device 100 and the second electronic device 200 may also output both the guide message notifying the success of the handover and the guide message instructing the move to the other electronic device to execute the relay protocol.

The user may determine whether at least one of the first electronic device 100 and the second electronic device 200 travels to the other electronic device to execute the relay protocol according to the guide message provided from at least one of the first electronic device 100 and the second electronic device 200. That is, the user may relocate the first electronic device 100 within the NFC communication range R2 of the third electronic device 300 based on the guide message.

Steps S1050 and S1060 of FIG. 35 are the same as steps S940 and S950, respectively, and thus the detailed description will be omitted.

The first electronic device 100 may receive the handover selection message from the third electronic device 300 and may transmit the received handover selection message to the first electronic device 100 through the alternative communication means formed in step S1030 (S1070).

That is, in the relay protocol according to the third embodiment described in connection with FIG. 34, the first electronic device 100 receives the handover selection message from the third electronic device 300 and then relocates itself within the NFC communication range R1 of the second electronic device 200. However, in the embodiment described in connection with FIG. 35, the first electronic device 100 and the second electronic device 200 form the alternative communication link by performing the handover protocol in step S1030, and thus, the first electronic device 100 receiving the handover selection message from the third electronic device 300 does not need to relocate itself toward the second electronic device 200, thus providing user convenience.

More specifically, the first electronic device 100 may receive the handover selection message from the third electronic device 300 and transmit the received handover selection message to the second electronic device 200 through the Wi-Fi link formed with the second electronic device 200.

Thus, the second electronic device 200 may happen to receive the handover selection message of the third electronic device 300.

Receiving the handover selection message of the third electronic device 300, the second electronic device 200 may send a request of establishing a connection to the third electronic device 300 based on the handover selection message (S1080).

According to the request of establishing a connection, the second electronic device 200 and the third electronic device 300 may establish a connection.

After the connection is established between the second electronic device 200 and the third electronic device 300, at least one of the second electronic device 200 and the third electronic device 300 may output a guide message notifying that the establishment of the connection has been successfully complete. The guide message notifying that the establishment of the connection has been successfully complete may be displayed on the background screen image of the third electronic device 300 and the second electronic device 200, as a pop-up window, or as a widget.

On the other hand, when failing to receive the handover selection message of the third electronic device 300 during a predetermined time interval, the second electronic device 200 may create an error message.

The second electronic device 200 may output through the output unit of the second electronic device 200 the generated error message.

Further, the second electronic device 200 may notify the first electronic device 100 of occurrence of an error. For example, the second electronic device 200 may transmit an error message to the first electronic device 100 through Wi-Fi connection generated according to the handover protocol in step S1030 together with the first electronic device 100.

At this time, the error message may include information notifying that the predetermined time has been past.

Receiving the error message, the first electronic device 100 may output the error message through the output unit 150 as shown in FIG. 36(b). That is, the user may identify through the first electronic device 100 that the error has occurred. More specifically, the user may identify that the second electronic device 200 has not received the handover request message from the first electronic device 100 a predetermined time after having sent the handover request message to the first electronic device 100.

According to the relay protocol according to the fourth embodiment, although the second electronic device 200 and the third electronic device 300 do not form an NFC link, the second electronic device 200 and the third electronic device 300 may form a connection via the first electronic device 100 as if they perform the handover protocol.

In the third and fourth embodiments of the relay protocol described in connection with FIGS. 34 and 35, the handover request/selection message described regarding the handover protocol may be used as it is. Thus, according to the third and fourth embodiments of the relay protocol, the message type may be simplified.

Further, the handover request/selection message in the third and fourth embodiments is the same as the handover request/selection message used for the above-described handover protocol and thus the detailed description will be omitted.

Hereinafter, a relay protocol according to a fifth embodiment of the present invention will be described in greater detail with reference to the drawings.

Figure 37:
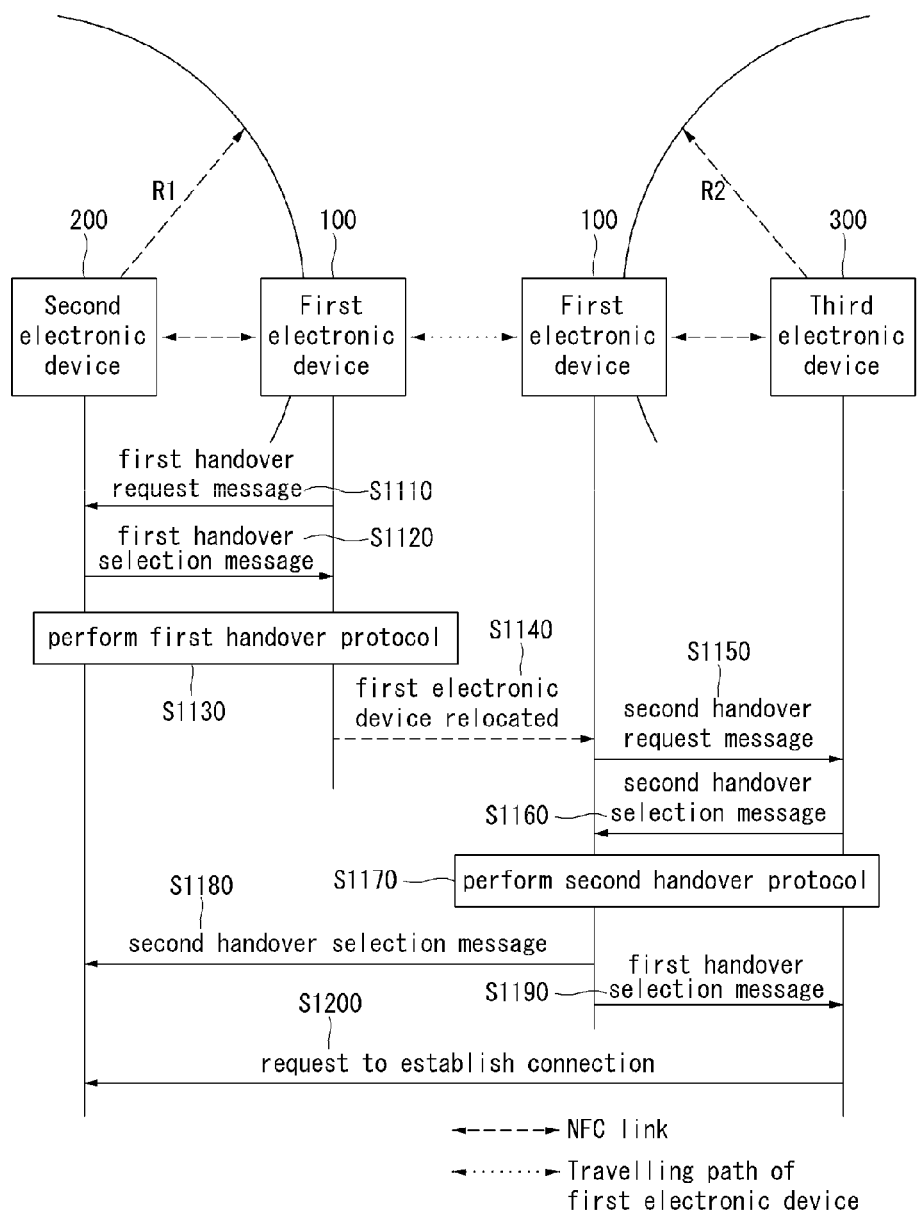
FIG. 37 is a view for describing a relay protocol according to a fifth embodiment of the present invention.

FIG. 37 is a view for describing a relay protocol according to a fifth embodiment of the present invention.

In describing the relay protocol according to the fifth embodiment, the same portion as the above-described relay protocol is not repeatedly described.

Referring to FIG. 37, the first electronic device 100 may transmit a first handover request message to the second electronic device 200 (S1110).

In the third and fourth embodiments described in connection with FIGS. 34 and 35, the second electronic device 200 transmits the handover request message to the first electronic device 100 which is a relaying device. In the present embodiment, however, the relaying device, the first electronic device 100, sends the handover request message to the second electronic device 200. This is a different between the embodiments.

For example, the first electronic device 100 may receive an instruction to execute the relay protocol from the user after the first electronic device 100 and the second electronic device 200 form an NFC link. Receiving the execution of the relay protocol from the user, the first electronic device 100 may send the first handover request message to the second electronic device 200. The first handover request message may have the same data structure as the handover request message used for the above-described handover protocol.

Receiving the first handover request message from the first electronic device 100, the second electronic device 200 may transmit the first handover selection message to the first electronic device 100 in response to the first handover request message (S1120).

Here, the first handover selection message transmitted from the second electronic device 200 to the first electronic device 100 may have the same data structure as the handover selection message used for the above-described handover protocol.

Receiving the first handover selection message from the second electronic device 200, the first electronic device 100 may perform the first handover protocol together with the second electronic device 200 (S1130).

That is, the first electronic device 100 which has sent the first handover request message to the second electronic device 200 becomes the handover requester, and the second electronic device 200 which has sent the first handover selection message to the first electronic device 100 becomes the handover selector, thereby performing the above-described handover protocol.

According to the first handover protocol, a Wi-Fi link is assumed to be formed.

That is, the first electronic device 100 may continue to communicate with the second electronic device 200 through the Wi-Fi link even departing from the NFC communication range R1 of the second electronic device 200.

After the first handover protocol is successfully performed, the first electronic device 100 may output the guide message described in the third and fourth embodiments.

Step S1140 of FIG. 35 is the same as step S960 of FIG. 33 and step S1040 of FIG. 34, and thus, the detailed description will be omitted.

The first electronic device 100 may send a second handover request message to the third electronic device 300 through the NFC link formed together with the third electronic device 300 (S1150).

Receiving the second handover request message, the third electronic device 300 may transmit the second handover selection message to the first electronic device 100 in response to the second handover request message (S1160).

Receiving the second handover selection message, the first electronic device 100 may perform the second handover protocol with the third electronic device 300.

It is assumed that the NFC link is handed over to the Wi-Fi link between the first electronic device 100 and the third electronic device 300.

At least one of the first electronic device 100 and the third electronic device 300 may output through the output unit information notifying that the second handover protocol has been successfully performed.

After performing the second handover protocol, the first electronic device 100 may relay the second handover selection message received from the third electronic device 300 to the second electronic device 200 (S1180).

That is, the first electronic device 100 may transmit the second handover selection message of the third electronic device 300 to the second electronic device 200 through the Wi-Fi link formed with the second electronic device 200 in step S1130.

Further, the first electronic device 100 may relay the first handover selection message of the second electronic device 200 to the third electronic device 300 (S1190).

That is, the first electronic device 100 may transmit to the third electronic device 300 the first handover selection message of the second electronic device 200 through the Wi-Fi link formed with the third electronic device 300 in step S1170.

By doing so, the second electronic device 200 may obtain the second handover selection message of the third electronic device 300, and the third electronic device 300 may obtain the first handover selection message of the second electronic device 200.

Accordingly, the second electronic device 200 and the third electronic device 300 may establish a connection based on the first and second handover selection messages (S1200).

For instance, the second electronic device 200 may send a request of establishing a connection to the third electronic device 300. That is, the second electronic device 200 that has received/transmitted the first handover request message and the first handover selection message may send a request of connection establishment to the third electronic device 300.

Or, an electronic device which has first received its counterpart's handover selection message from the first electronic device 100 may send a connection request to the counterpart. For instance, when first receiving the second handover selection message of the third electronic device 300 which is the counterpart of the second electronic device 200 from the first electronic device 100, the second electronic device 200 may send a connection request to the third electronic device 300.

By the above process, when the connection is successfully established between the second electronic device 200 and the third electronic device 300, at least one of the first electronic device 100, the second electronic device 200, and the third electronic device 300 may output a guide message notifying that the connection has been successfully established between the second electronic device 200 and the third electronic device 300.

The handover request message and the handover selection message used for the relay protocol according to the fifth embodiment of the present invention may have the same data structure as the handover request message and the handover selection message used for the handover protocol.

Further, the handover request message used for describing the relay protocol according to the fifth embodiment may have the same structure as the relay request message shown in FIG. 32.

Hereinafter, a relay protocol according to a sixth embodiment of the present invention will be described in detail with reference to the drawings.

Figure 38:
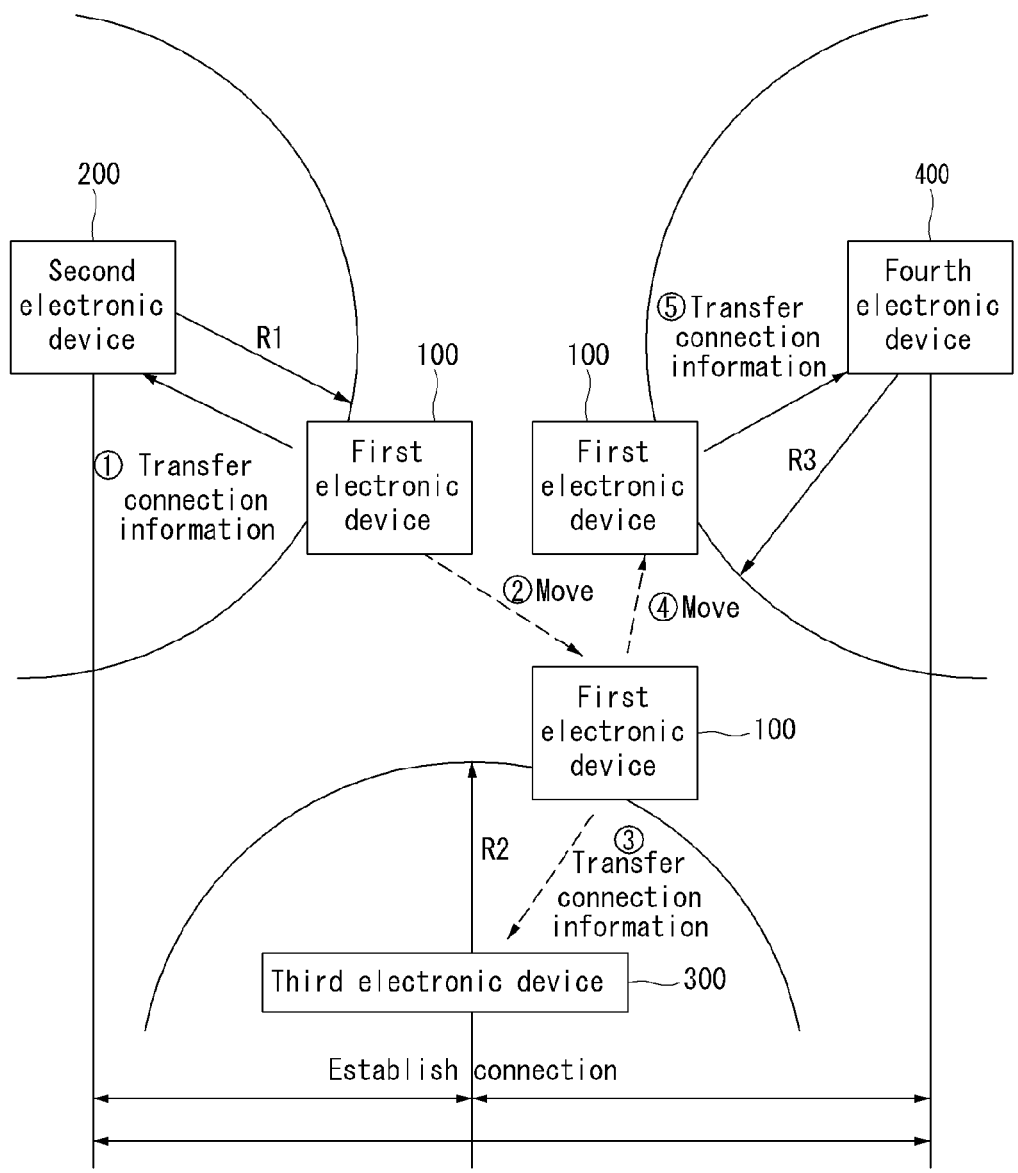
FIG. 38 is a view for describing a relay protocol according to a sixth embodiment of the present invention.

FIG. 38 is a view for describing a relay protocol according to a sixth embodiment of the present invention.

The relay protocol according to the sixth embodiment of the present invention shown in FIG. 38 is related to a method of establishing a connection by the first electronic device 100 when the first electronic device 100 which is a relaying device in the case that the first electronic device 100 may perform an AP function. In describing the present embodiment, the first electronic device 100 is assumed to support the Wi-Fi AP (Access Point) function.

Referring to FIG. 38, the first electronic device 100 may enter into the NFC communication range R1 of the second electronic device 200, form an NFC link with the second electronic device 200, and transmit to the second electronic device 200 through the formed NFC link connection information for AP access of the first electronic device 100 to the second electronic device 200.

More specifically, the user may enter a command to execute the relay protocol to the first electronic device 100. Simultaneously, the user may input a command to use the first electronic device 100 as an AP. That is, the first electronic device 100 may receive information instructing the first electronic device 100 to perform the Wi-Fi AP function.

According to the command, the first electronic device 100 may generate environment setup information necessary for another electronic device to access the Wi-Fi AP provided by the first electronic device 100. Hereinafter, this is simply referred to as connection information.

The first electronic device 100 may send the connection information to the second electronic device 200 through the NFC link formed with the second electronic device 200.

Receiving the connection information, the second electronic device 200 may generate a Wi-Fi connection with the first electronic device 100 based on the received connection information.

When the Wi-Fi connection is successfully established between the first electronic device 100 and the second electronic device 200, at least one of the first electronic device 100 and the second electronic device 200 may output through the output unit a guide message notifying that the Wi-Fi connection has been successfully established.

At least one of the first electronic device 100 and the second electronic device 200 may also output a guide message instructing the move toward another electronic device to establish a Wi-Fi network.

The first electronic device 100 may relocate itself within the NFC communication range R2 of the third electronic device 300 to thereby form an NFC link with the third electronic device 300.

The first electronic device 100 may send the connection information to the third electronic device 300 through the NFC link formed with the third electronic device 300.

Receiving the connection information, the second electronic device 200 may also form a Wi-Fi network with the first electronic device 100.

Further, in the same way, the first electronic device 100 may also form a Wi-Fi connection with the fourth electronic device.

By doing so, as shown in the lower part of FIG. 38, the first electronic device 100, the second electronic device 200, the third electronic device 300, and the fourth electronic device may communicate with each other through the Wi-Fi connection.

Hereinafter, an applied example of the relay protocol according to the first to sixth embodiments will be specifically described with reference to the drawings.

Figure 39:
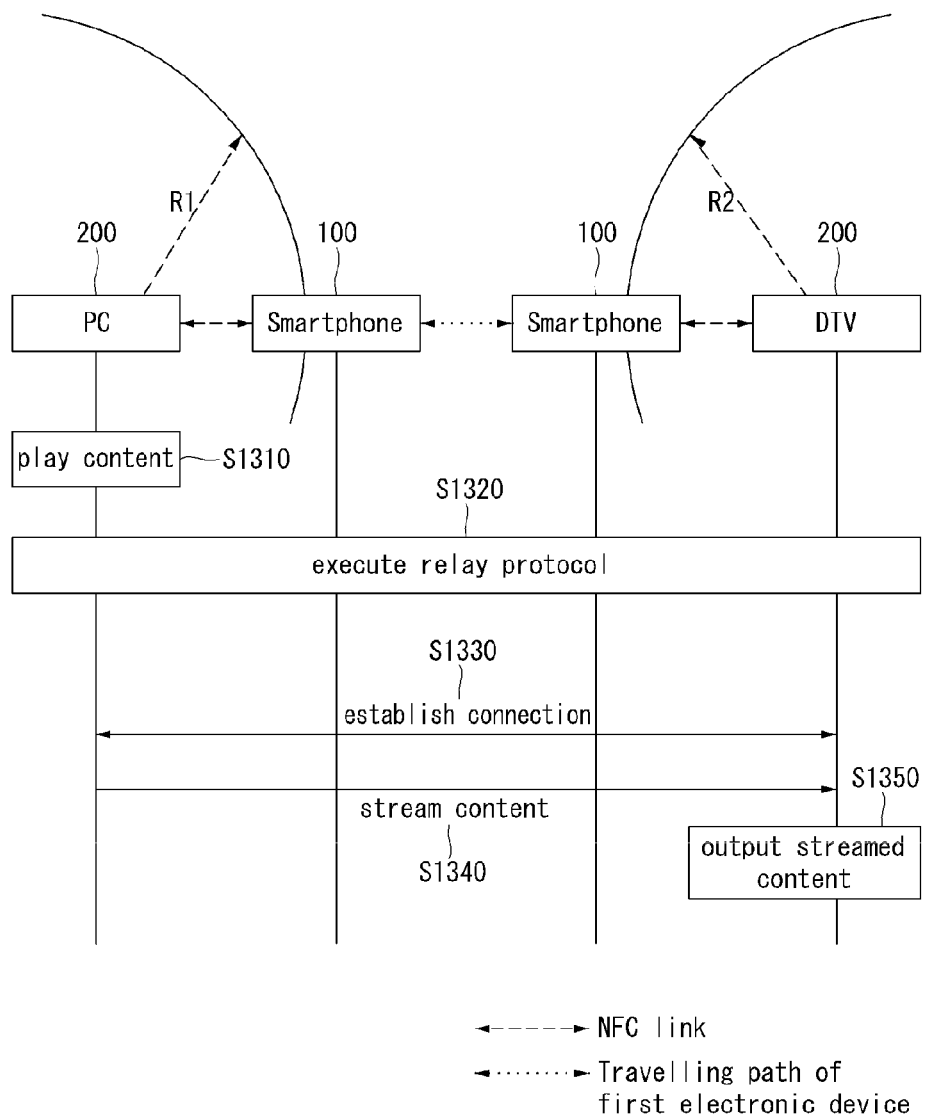
FIG. 39 illustrates a first applied example using the relay protocol according to the present invention.
Figure 40:
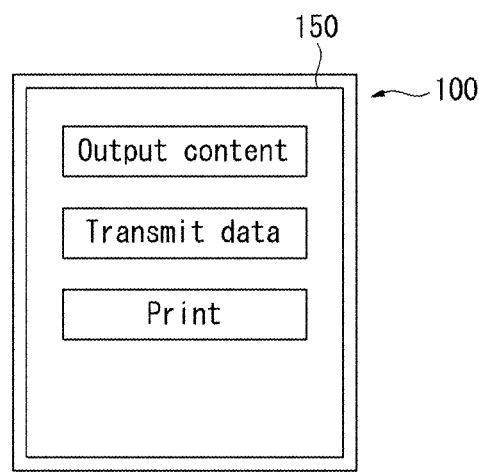
FIG. 40 illustrates a user interface for describing the relay protocol according to the present invention.

FIG. 39 illustrates a first applied example using the relay protocol according to the present invention. FIG. 40 illustrates a user interface for describing the relay protocol according to the present invention.

As shown in FIG. 39, it is assumed that the first electronic device 100 is a smartphone, the second electronic device 200 is a PC, and the third electronic device 300 is a DTV.

Referring to FIG. 39, the second electronic device 200 may have a situation of being playing contents (S1310).

At this time, the first electronic device 100 may execute the relay protocol to form a connection between the second electronic device 200 and the third electronic device 300 (S1320). Here, the relay protocol may be one of the relay protocols according to the first to sixth embodiments.

When the user gives a relay protocol command, at least one of the first electronic device 100 and the second electronic device 200 may provide a user interface to be able to receive whatever action is to be performed through the relay protocol.

For example, as shown in (a) of FIG. 40, the first electronic device 100 may select an action to be performed through a connection between the second electronic device 200 and the third electronic device 300.

Referring to (a) of FIG. 40, as the action to be performed through the relay protocol, content output, data transmission, and printing are illustrated. This is merely an example, and other various actions may be done through the relay protocol. Here, the content output refers to the second electronic device 200 streaming contents to the third electronic device 300 so that the contents from the second electronic device 200 may be output by the third electronic device 300. The data transmission and the printing will be described later.

In this embodiment, the user's action to be performed through the relay protocol is assumed to be content output.

As the relay protocol is executed, a connection may be established between the second electronic device 200 and the third electronic device 300 (S1330).

The second electronic device 200 may stream contents in play through the established connection to the third electronic device 300 (S1340).

In other words, when the user selects the content output through the relay protocol, the second electronic device 200 may stream the contents to the third electronic device 300.

At this time, the streamed contents may be selected by the user, or there may be a default to allow the content being currently output by the second electronic device 200 to be streamed.

For example, in the case that there is content currently played by the second electronic device 200, the currently played content may be automatically selected to be streamed to the third electronic device 300.

Further, for example, when the second electronic device 200 does not currently output the content, content to be streamed to the third electronic device 300 may be selected by the user.

Here, the content being output by the second electronic device 200 is assumed to be streamed to the third electronic device 300.

The third electronic device 300 may output through the output unit of the third electronic device 300 the received content stream (S1350).

Accordingly, the user may conveniently allow the content currently in play by the second electronic device 200 to be played by the third electronic device 300. For this, the second electronic device 200 may transmit a content play command signal to the third electronic device 300 while simultaneously streaming the content to the third electronic device 300.

Also, the second electronic device 200 may send the content to the third electronic device 300 so that the content being played by the second electronic device 200 may be continuously played by the third electronic device 300.

Accordingly, the user may seamlessly view the content through the second electronic device 200 and the third electronic device 300.

Further, while streaming the content to the third electronic device 300, the second electronic device 200 may power off the output unit of the second electronic device 200, thereby saving power. For example, the second electronic device 200 may provide a user interface to the user to inquire whether the output unit of the second electronic device 200 is to be turned off.

In the embodiment described in connection with FIG. 39, although it has been described that the content being played by the second electronic device 200 is transferred to the third electronic device 300, this is merely an example. That is, various contents may be transmitted from the second electronic device 200 to the third electronic device 300. That is, when the user selects the data transmission option shown in (a) of FIG. 40, the second electronic device 200 may transmit to the third electronic device 300 through the connection established with the third electronic device 300, e.g., various data, contacts, emails, voice signals, or signals received through a mobile communication network.

Figure 41:
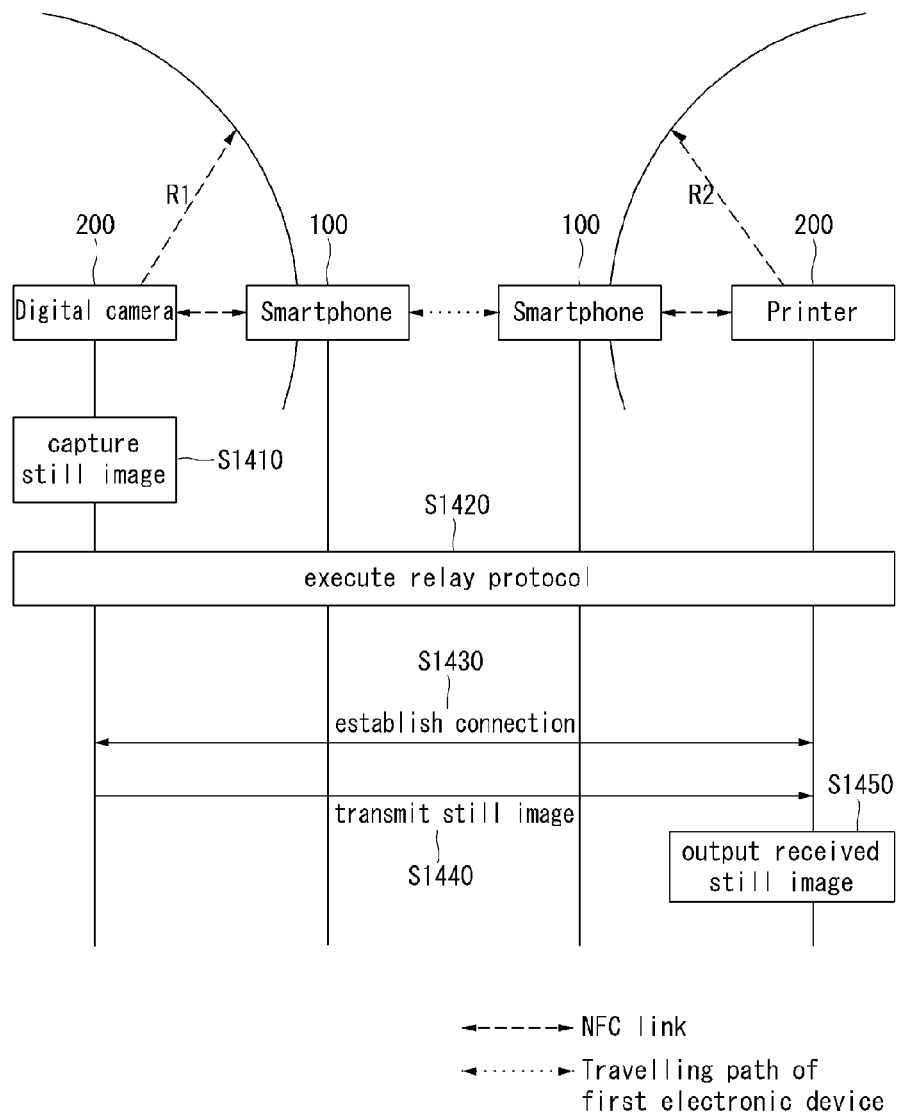
FIG. 41 illustrates a second applied example used for the relay protocol according to the present invention.

FIG. 41 illustrates a second applied example used for the relay protocol according to the present invention.

As shown in FIG. 41, it is assumed that the first electronic device 100 is a smartphone, the second electronic device 200 is a digital camera, and the third electronic device 300 is a printer.

Referring to FIG. 41, the second electronic device 200 may capture a still image (S1410).

The second electronic device 200 may store the captured still image in the memory of the second electronic device 200.

The first electronic device 100 may execute a relay protocol to form a connection between the second electronic device 200 and the third electronic device 300 (S1420).

At this time, like in the first applied example described referring to FIG. 39, an option to perform the relay protocol may be selected for the first electronic device 100 and the second electronic device 200. In this embodiment, the printing shown in (a) of FIG. 40 is assumed to be chosen.

Further, for example, when the first electronic device 100 is instructed by the user to do printing, the first electronic device 100 may transmit a command signal corresponding to printing to the second electronic device 200.

A connection may be established between the second electronic device 200 and the third electronic device 300 (S1430).

The second electronic device 200 may transmit to the third electronic device 300 the still image stored through the established connection (S1440).

The third electronic device 300 may print the still image received from the second electronic device 200 (S1450).

That is, according to the second applied example shown in FIG. 40, there is an advantage that the second electronic device 200 may print the still image through the third electronic device 300 in a convenient manner.

The technical scope of the invention is not limited to the applied examples 1 and 2, and may have various applied examples according to the specific functions of the first electronic device 100, the second electronic device 200, and the third electronic device 300.

For example, the relay protocol as used herein may be used for calculation in, e.g., restaurants, hotels, or department stores.

Taking a restaurant as an example, it is assumed that the second electronic device 200 is a counter terminal, the third electronic device 300 is a customer's terminal, and the first electronic device 100 is a waiter's terminal.

Conventionally, the customer needs to come close to where the counter terminal is positioned to make payment. However, by using the relay protocol according to the present invention, the customer may settle the payment even without approaching the counter terminal. In other words, the first electronic device 100 may form a communication link for payment between the second electronic device 200 and the third electronic device 300 according to the relay protocol, so that the customer may settle the payment in his seat.

More specifically, receiving the user's command to instruct payment to be made through the relay protocol, the first electronic device 100 may allow the third electronic device 300 to may payment to the second electronic device 200 through the relay protocol.

Or, in response to the user's command to instruct payment to be made through the relay protocol, the second electronic device 200 may perform a process of receiving payment from the third electronic device 300 via the first electronic device 100.

For example, the first electronic device 100 may perform the relay protocol so that the second electronic device 200 and the third electronic device 300 may form a communication link. Further, the first electronic device 100 may send the payment-related information from the second electronic device 200 to the third electronic device 300 while performing the relay protocol. By doing so, the second electronic device 200 and the third electronic device 300 may perform the payment process through the formed communication link.

In such case, for security, the second electronic device 200 and the third electronic device 300 may perform a payment authentication process, and if the authentication process is complete, may perform the payment process.

More specifically, the second electronic device 200 may transmit to the first electronic device 100 the payment-related information, such as, at least one of, e.g., amounts, purchased items, or security passwords. The first electronic device 100 may send to the third electronic device 300 the received calculation-related information.

The third electronic device 300 may perform the calculation process through the communication link formed based on the received calculation-related information.

At this time, the calculation-related information may be, when transferred, included in the message for the relay protocol. For example, when transferred, the calculation-related information may be included in additional data of the message transferred for the relay protocol. Or, the calculation-related information may be transferred separately from the message transferred from the relay protocol.

According to the above-described applied example of the relay protocol, the settlement process may be more efficiently performed.

The various embodiments disclosed herein may be implemented alone or in combination thereof. Further, the steps constituting one of the embodiments may be implemented in combination with the steps constituting another of the embodiments.

In other words, the embodiments associated with the handover protocol may be combined with each other, and the embodiments associated with relay protocol may be combined with each other.

Further, the embodiments associated with the handover protocol and the relay protocol may be combined with each other. Still further, when a handover request collision occurs in the relay protocol, a handover collision resolution protocol may be used.

Although it has been described that when describing the relay protocol, other electronic devices than the relaying device have low mobility, the technical spirit of the invention may also apply to electronic devices, e.g., cellular phones, having higher mobility other than the relaying device.

In describing the embodiments of the invention, the disclosed guide messages and user interfaces apply not only to the embodiments but to other embodiments having the same necessity as well.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

INDUSTRIAL APPLICABILITY

According to the present invention, there are provide an electronic device and a method of operating the electronic device, which may effectively form a connection between two or more electronic devices by allowing a relaying device to transfer connection information between the electronic devices to a counterpart.

The invention claimed is:

1. A method of operating a third device to establish a communication link between a first device and a second device, the method comprising:
    transmitting a first handover request message to the first device;
    receiving a first handover response message from the first device,
    wherein the first handover response message includes first power condition information related to a first alternative carrier, and first connection information for the first alternative carrier;
    transmitting a second handover request message to the second device;
    receiving a second handover response message from the second device,
    wherein the second handover response message includes second power condition information related to a second alternative carrier, and second connection information for the second alternative carrier; and
    transmitting a third handover response message containing alternative carrier information to the first device or the second device,
    wherein the alternative carrier information is determined based on at least one of the first alternative carrier or the second alternative carrier.

2. The method of claim 1,
    wherein each of the first handover response message and the second handover response message includes at least one of first version information or second version information, and
    wherein each of the first version information and the second version information indicates information related to a backward compatibility.

3. The method of claim 1,
    wherein the first alternative carrier and the second alternative carrier have an inactive status until a specific alternative carrier for the communication link is determined.

4. The method of claim 1,
    wherein the first power condition information and the second power condition information include at least one of active status information, inactive status information, activating status information or unknown status information.

5. The method of claim 1,
    wherein each of the first handover response message and the second handover response message includes at least one of auxiliary data reference count information or an auxiliary data reference,
    wherein the auxiliary data reference indicates NDEF (NFC Data Exchange Format) record providing additional information on the first alternative carrier or the second alternative carrier, and
    wherein the auxiliary data reference count information includes a number of the auxiliary data reference.

6. The method of claim 1, wherein the first handover response message sequentially includes information on a plurality of alternative carriers supported by the first device according to priorities.

7. The method of claim 1, wherein each of the first handover request message, the first handover response message, the second handover request message and the second handover response message includes flags indicating a beginning and an ending of a message.

8. A third device establishing a communication link between a first device and a second device, wherein the third device comprising:
    a receiver that receives a first handover response message from the first device and a second handover response message from the second device,
    wherein the first handover response message includes first power condition information related to a first alternative carrier and first connection information for the first alternative carrier, and
    wherein the second handover response message includes second power condition information related to a second alternative carrier and second connection information for the second alternative carrier;
    a transmitter that transmits a first handover request message to the first device and a second handover request message to the second device,
    wherein the transmitter transmits a third handover response message containing alternative carrier information to the first device or the second device; and a controller that determines the alternative carrier information, wherein the alternative carrier information is determined based on at least one of the first alternative carrier or the second alternative carrier.

9. The third device of claim 8, wherein each of the first identification information and the second identification information includes at least one of an alternative carrier type format, an alternative carrier type length, an alternative carrier type, or alternative carrier data.

10. The third device of claim 8, wherein each of the first handover response message and the second handover response message includes at least one of first version information or second version information, and wherein each of the first version information and the second version information indicates information related to a backward compatibility.

11. The third device of claim 8, wherein the first alternative carrier and the second alternative carrier have an inactive status until a specific alternative carrier for the communication link is determined.

12. The third device of claim 8, wherein the first power condition information and the second power condition information includes at least one of active status information, inactive status information, activating status information or unknown status information.

13. The third device of claim 8, wherein each of the first handover response message and the second handover response message includes at least one of auxiliary data reference count information or an auxiliary data reference, wherein the auxiliary data reference indicates NDEF (NFC Data Exchange Format) record providing additional information on the first alternative carrier or the second alternative carrier, and wherein the auxiliary data reference count information includes a number of the auxiliary data reference.

14. The third device of claim 8, wherein each of the first handover request message, the first handover response message, the second handover request message and the second handover response message includes flags indicating a beginning and an ending of a message.

* * * * *